(12) United States Patent
Imamura et al.

(10) Patent No.: US 9,514,532 B2
(45) Date of Patent: Dec. 6, 2016

(54) IMAGE PROCESSING APPARATUS OPHTHALMOLOGIC IMAGING SYSTEM AND IMAGE PROCESSING METHOD

(71) Applicant: CANON KABUSHIKI KAISHA, Tokyo (JP)

(72) Inventors: Hiroshi Imamura, Kyoto (JP); Keiko Yonezawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 14/379,261

(22) PCT Filed: Feb. 14, 2013

(86) PCT No.: PCT/JP2013/000814
§ 371 (c)(1),
(2) Date: Aug. 15, 2014

(87) PCT Pub. No.: WO2013/125187
PCT Pub. Date: Aug. 29, 2013

(65) Prior Publication Data
US 2016/0019691 A1 Jan. 21, 2016

(30) Foreign Application Priority Data
Feb. 20, 2012 (JP) ................................. 2012-034345

(51) Int. Cl.
*G06K 9/00* (2006.01)
*G06T 7/00* (2006.01)
(Continued)

(52) U.S. Cl.
CPC ......... *G06T 7/0012* (2013.01); *G06K 9/00604* (2013.01); *G06T 5/50* (2013.01); *G06T 7/0081* (2013.01); *G06T 2207/10004* (2013.01);
(Continued)

(58) Field of Classification Search
CPC ................................... G06K 9/00; A61B 5/00
USPC ......... 382/128–134; 600/381, 454, 468, 480, 600/482, 485, 500, 504; 351/205, 206
See application file for complete search history.

(56) References Cited

U.S. PATENT DOCUMENTS 7,537,340 B2 * 5/2009 Yamaguchi ............. A61B 3/14
351/205
2004/0258285 A1 12/2004 Hansen
(Continued)

FOREIGN PATENT DOCUMENTS

CN 101968886 A 2/2011
WO 90/05957 A1 5/1990

OTHER PUBLICATIONS

A.Uji et al: "The Source of Moving Particles in Parafoveal Capillaries Detected by Adaptive Optics Scanning Laser Ophthalmoscopy", pp. 171-178, IOVS, Jan. 2012, vol. 53, No. 1.
(Continued)

*Primary Examiner* — Abolfazl Tabatabai
(74) *Attorney, Agent, or Firm* — Canon U.S.A., Inc. IP Division

(57) ABSTRACT

An image processing apparatus includes an identifying unit configured to identify a region relating to the movement of blood cells on a fundus image captured by an ophthalmologic imaging apparatus that includes an adaptive optics system, and an acquisition unit configured to acquire information relating to a tissue that is positioned on a back side of a position where the movement of blood cells is recognized, when it is seen from an anterior eye part side, in the identified region.

24 Claims, 21 Drawing Sheets

(51) Int. Cl.
*G06T 5/50* (2006.01)
*G02C 7/02* (2006.01)
*A61B 3/10* (2006.01)

(52) U.S. Cl.
CPC ........... *G06T 2207/10101* (2013.01); *G06T 2207/20221* (2013.01); *G06T 2207/30041* (2013.01); *G06T 2207/30104* (2013.01)

(56) References Cited

U.S. PATENT DOCUMENTS

2008/0007693 A1  1/2008  Williams
2012/0063660 A1*  3/2012  Imamura ............. A61B 5/0066 382/131
2012/0140170 A1  6/2012  Hirose

OTHER PUBLICATIONS

Gang Huang et al: "Lucky averaging: quality improvement of adaptive optics scanning laser ophthalmoscope images", Optics Letters/ vol. 36, No. 19, Oct. 1, 2011, pp. 3786-3788.
Roorda Austin et al: "Adaptive optics scanning laser ophthalmoscopy", May 6, 2012/vol. 10, No. 9, Optics Express 405, pp. 405-412.

* cited by examiner

IMAGE PROCESSING APPARATUS OPHTHALMOLOGIC IMAGING SYSTEM AND IMAGE PROCESSING METHOD

TECHNICAL FIELD

The claimed invention relates to an image processing apparatus that can process an image including a blood vessel of a subject and output information relating to a target tissue. Further, the claimed invention relates to an ophthalmologic imaging system and an image processing method.

BACKGROUND ART

It is conventionally known that a blood vessel region has an adverse influence on a measuring beam, compared to other region, when an image analysis is performed by noninvasively imaging a target tissue of a human body. The image quality or the resolution tends to decrease in a region underlying a blood vessel. For example, in an adaptive optics scanning laser ophthalmoscope (AO-SLO) that scans an eye part with the measuring beam while correcting an aberration of the eye part with an adaptive optics system, the blood vessel region has an adverse influence on the measuring beam and therefore the luminance value of an image of the region underlying the blood vessel tends to become lower.

To ensure the identification of a tissue in such a blood vessel region, as discussed in US2012/0063660, it is conventionally feasible to extract a layered structure that underlies a blood vessel in an optical coherence tomography image (i.e., an OCT image) by differentiating the processing method to be applied to a region that underlies the blood vessel and other region. As discussed in US2004/0258285, it is feasible to determine a lesion of a specific region based on background image information in a fundus image.

CITATION LIST

Patent Literature

PTL 1: US2012/0063660
PTL 2: US2004/0258285

SUMMARY OF INVENTION

The claimed invention is directed to a technique capable of accurately identifying a tissue that underlies a blood vessel of an eye part based on information relating to the movement of blood cells.

According to an exemplary embodiment of the claimed invention, an image processing apparatus includes an identifying unit configured to identify a region relating to the movement of blood cells on a fundus image captured by an ophthalmologic imaging apparatus that includes an adaptive optics system, and an acquisition unit configured to acquire information relating to a tissue that is positioned on a back side of a position where the movement of blood cells is recognized, when it is seen from an anterior eye part side, in the identified region.

Further features and aspects of the embodiments of the claimed invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

An image processing apparatus according to a first exemplary embodiment, which can identify a blood cell region on an SLO moving image, select a luminance value in a high-luminance blood cell region to perform image correction, and generate an SLO image in which the amount of a shadow of blood cells is reduced, is described below.

Figure 1:
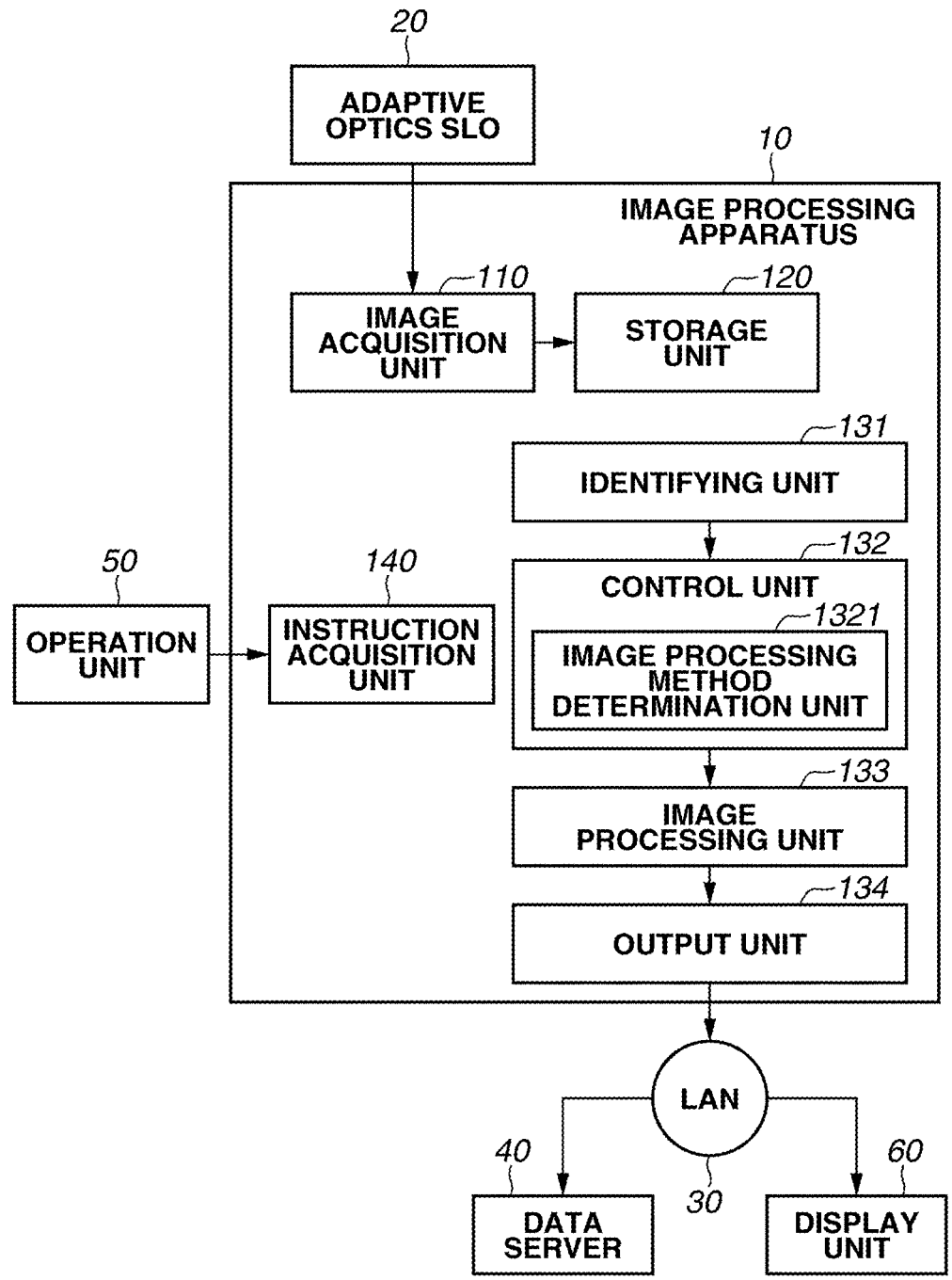
FIG. 1 illustrates an example of a system configuration according to a first exemplary embodiment.

FIG. 1 illustrates an example configuration of an ophthalmologic imaging system that includes an image processing apparatus 10 according to the present exemplary embodiment. The ophthalmologic imaging system illustrated in FIG. 1 includes the image processing apparatus 10, an adaptive optics SLO 20, a local area network (LAN) 30, a data server 40, an operation unit 50, and a display unit 60. The image processing apparatus 10 is connected to the data server 40 and the display unit 60 via the LAN 30, which can be constituted by an optical fiber, a universal serial bus (USB) or IEEE1394. The image processing apparatus 10 can be connected to the adaptive optics SLO 20 and the operation unit 50 via the LAN 30. Alternatively, the image processing apparatus 10 can be connected to these devices via an external network (e.g., Internet).

The adaptive optics SLO 20 is an apparatus that can capture a planar image (i.e., an SLO moving image D) of a fundus part while compensating the aberration of an eye part with an adaptive optics system. When the adaptive optics SLO 20 captures the SLO moving image D, the adaptive optics SLO 20 transmits the captured SLO moving image D together with information indicating a fixation target position F used in the imaging operation to the image processing apparatus 10 and the data server 40.

The data server 40 stores the SLO moving image D of a subject's eye and imaging condition data (e.g., the fixation target position F), image features of the eye part, and a normal value relating to a distribution of the image features of the eye part. The image features of the eye part according to the claimed invention include image features of photoreceptor cells C and lamina cribrosa pores. The data server 40 stores the SLO moving image D and the fixation target position F (i.e., the data having been output from the adaptive optics SLO) and the image features of the eye part (i.e., the data having been output from the image processing apparatus 10).

Further, in response to a request from the image processing apparatus 10, the data server 40 transmits the SLO moving image D, the image features of the eye part, and the normal data of the image feature to the image processing apparatus 10. The operation unit 50 enables a user to input operational information and sends the input information to the image processing apparatus 10. The display unit 60 can display the information received from the image processing apparatus 10.

The image processing apparatus 10 includes an image acquisition unit 110, a storage unit 120, an identifying unit 131, a control unit 132, an image processing unit 133, an output unit 134, and an instruction acquisition unit 140.

The identifying unit 131 can identify a region relating to the movement of a blood cell on a fundus image obtained by an ophthalmologic imaging apparatus that includes an adaptive optics system. More specifically, the identifying unit 131 identifies a high-luminance blood cell region by performing differential processing on the SLO moving image D that includes an outer retina of a macula.

The control unit 132 can selectively change an image processing method to be applied to the identified region and other region. In this respect, the control unit 132 is functionally operable as a control unit configured to perform a control in such a way as to differentiate the processing to be applied to the identified region and other region of the fundus image. In the present exemplary embodiment, an image processing method determination unit 1321 can instruct in such a way as to select the luminance value of the high-luminance blood cell region at each x-y position of the SLO moving image D.

The image processing unit 133 can acquire information relating to a fundus tissue by differently applying image correction processing to the region relating to the movement and a region that is different from the movement related region. In this respect, the image processing unit 133 is functionally operable as an acquisition unit. The image processing unit 133 acquires information of a tissue that is located on the back side of a position where the movement of blood cells can be recognized, when seen from an anterior eye part side, in the blood cell movement related region, based on image information of the movement related region. The image processing unit 133 selects the luminance value of a frame in which the high-luminance blood cell region is present at each x-y position to generate an SLO image in which a shadow of red blood cells has been corrected.

The output unit 134 can output the corrected SLO image, as fundus tissue information, to the display unit 60. The display unit 60 displays the corrected SLO image. In this respect, the output unit 134 is functionally operable as a display control unit. Thus, it is feasible to generate and display an SLO image that includes photoreceptor cells C that are visually recognizable at a region where the blood vessel stretches.

Figure 2:
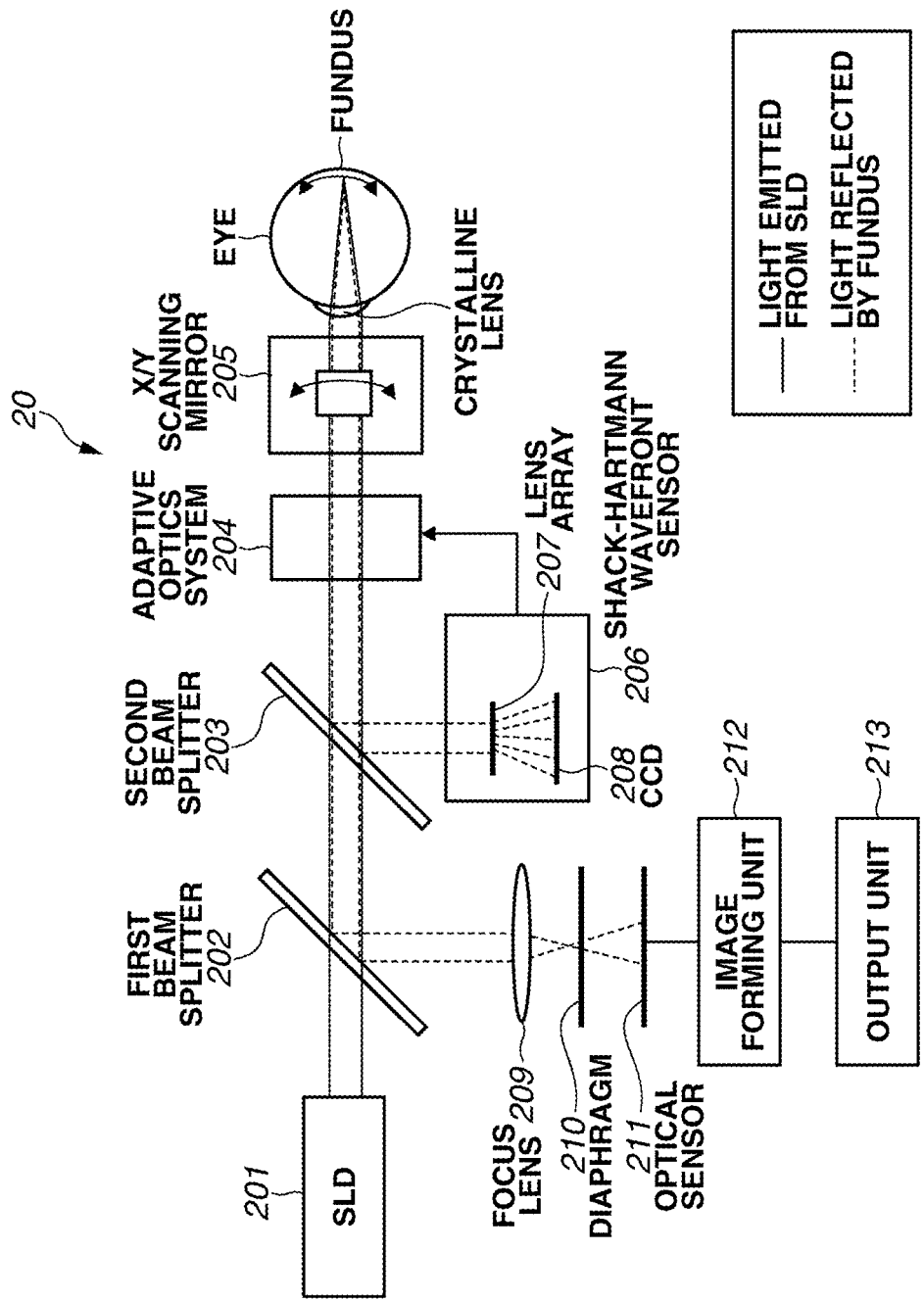
FIG. 2 illustrates an example configuration of an adaptive optics SLO imaging apparatus according to the first exemplary embodiment.

An example configuration of the adaptive optics SLO 20 or the adaptive optics scanning laser ophthalmoscope (AO-SLO) is described below with reference to FIG. 2. The adaptive optics SLO 20 includes a super luminescent diode (SLD) 201, a Shack-Hartmann wavefront sensor 206, an adaptive optics system 204, a first beam splitter 202, a second beam splitter 203, an X-Y scanning mirror 205, a focus lens 209, a diaphragm 210, an optical sensor 211, an image forming unit 212, and an output unit 213.

The light emitted from the SLD 201 (i.e., a light source) is reflected by a fundus. A part of the reflected light reaches the Shack-Hartmann wavefront sensor 206 via the second beam splitter 203. The rest of the reflected light reaches the optical sensor 211 via the first beam splitter 202. The Shack-Hartmann wavefront sensor 206 is a device that can measure an aberration of the eye. A lens array 207 is connected to a charge-coupled device (CCD) 208. When the incident light penetrates the lens array 207, a group of light spots appears on the CCD 208 and wavefront aberrations can be measured based on the misregistration of the projected light spots.

The adaptive optics system 204 can correct the aberration by driving an aberration correction device (e.g., a deformable mirror or a spatial light phase modulator) based on the wavefront aberration measured by the Shack-Hartmann wavefront sensor 206. The light having been subjected to the above-described aberration correction can reach the optical sensor 211 via the focus lens 209 and the diaphragm 210. The X/Y scanning mirror 205 is movable to control the scanning position of the fundus.

Therefore, it is feasible to acquire imaging data (e.g., an imaging target region and imaging time (i.e., frame rate× number of frames)), which have been designated beforehand by an operator. The acquired data is transmitted to the image forming unit 212. The image forming unit 212 performs correction processing (e.g., processing for correcting an image deformation that may occur due to dispersion in scanning speed or correcting a luminance value) on the received data to form image data (e.g., a moving image or a still image).

The output unit 213 can output the image data formed by the image forming unit 212. The aberration correction device in the adaptive optics system 204 is usable to perform an adjustment in focusing a specific depth position of the fundus. Alternatively, if a focus adjustment lens (not illustrated) is provided in an optical system, it is useful to perform the adjustment while moving the focus adjustment lens.

Figure 3:
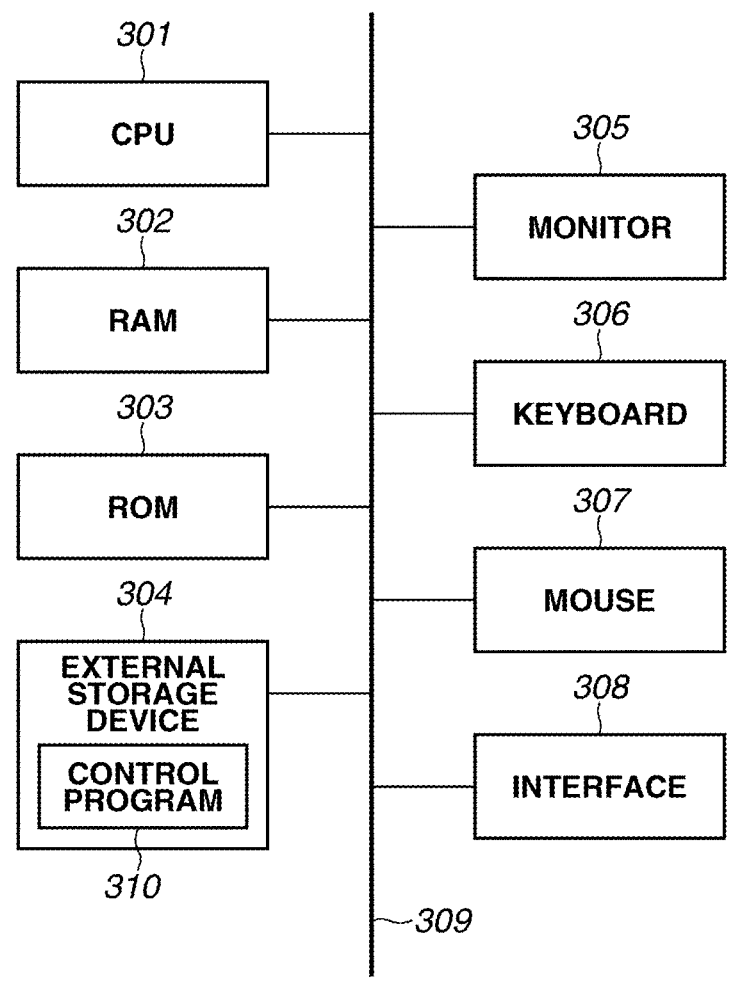
FIG. 3 illustrates a hardware configuration applicable to an image processing apparatus, and a recording medium that stores a software program that can realize processing according to an exemplary embodiment.

An example hardware configuration, which is applicable to the image processing apparatus 10 and the operation unit 50, is described below with reference to FIG. 3. The hardware configuration illustrated in FIG. 3 includes a central processing unit (CPU) 301, a random access memory (RAM) 302, a read only memory (ROM) 303, an external storage device 304, a monitor 305, a keyboard 306, a mouse 307, and an interface 308.

Figure 4:
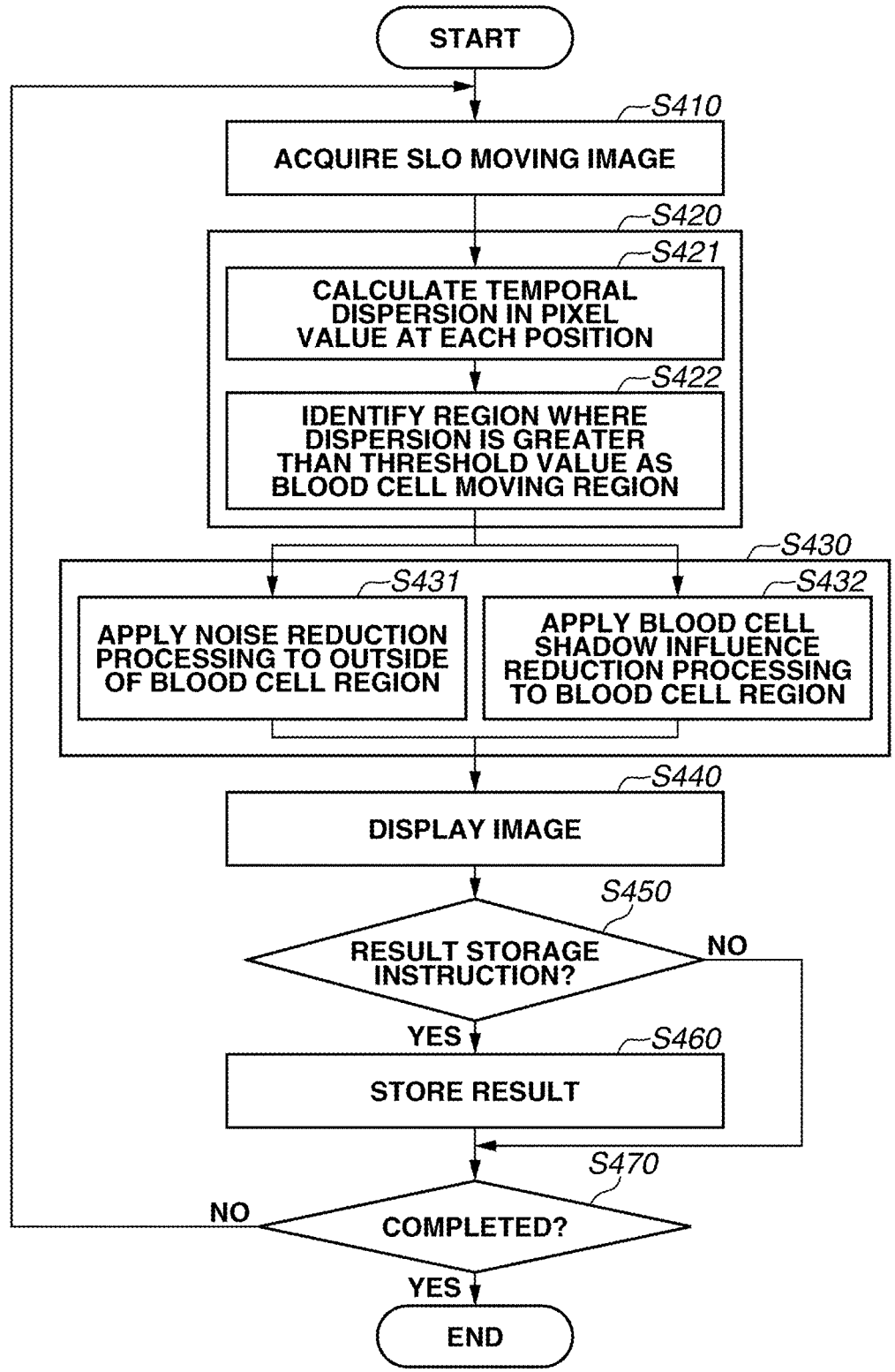
FIG. 4 is a flowchart illustrating an example of image processing that can be performed by the image processing apparatus according to the first exemplary embodiment.

Control programs 310, which are required to realize image processing of a flowchart illustrated in FIG. 4, and various data to be used when the control program is executed are stored beforehand in the external storage device 304. These control programs and the related data can be appropriately loaded into the RAM 302 via a bus 309, under the control of the CPU 301, and can be executed by the CPU 301 to realize operations of the functional units described below.

Each functional unit that constitutes the image processing apparatus 10 is described below in association with an example execution procedure of the image processing apparatus 10, with reference to the flowchart illustrated in FIG. 4.

Figure 5A:
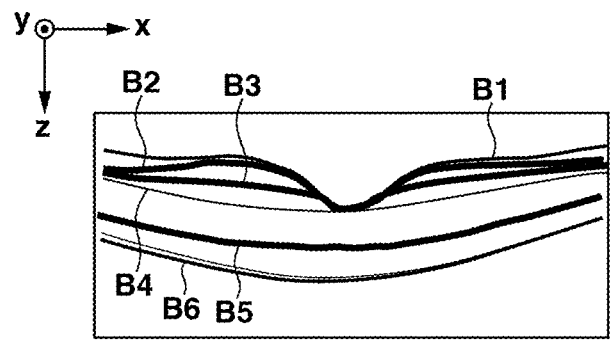
FIG. 5A illustrates an example of image processing according to the first exemplary embodiment.

FIGS. 5A to 5F schematically illustrate the SLO moving image D obtained by the adaptive optics SLO 20 and example processing that can be performed by the image processing apparatus 10. FIG. 5A illustrates a tomographic image of a retina that can be obtained by an optical coherence tomography (OCT) imaging apparatus.

The retina illustrated in FIG. 5A has a layered structure, which includes an internal limiting membrane (ILM) B1, a lower boundary B2 of a nerve fiber layer (NFL), a lower boundary B3 of a ganglion cell layer (GCL), a lower boundary B4 of an inner plexiform layer (IPL), a photoreceptor inner/outer segment junction (IS/OS) B5, and a retinal pigment epithelium (RPE) B6.

Figure 5B:
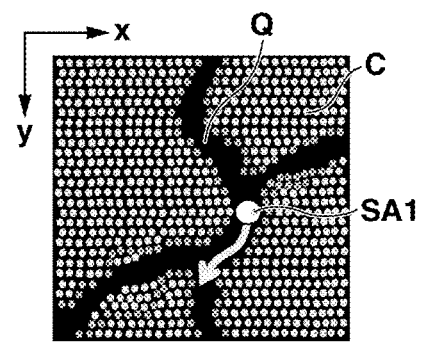
FIG. 5B illustrates an example of image processing according to the first exemplary embodiment.
Figure 5C:
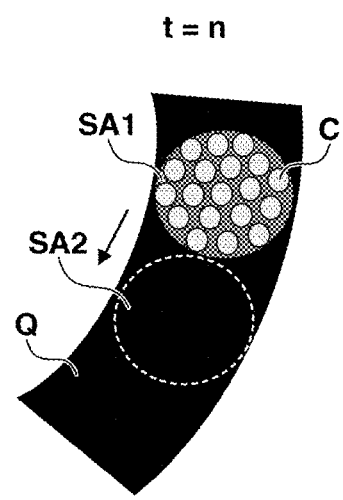
FIG. 5C illustrates an example of image processing according to the first exemplary embodiment.
Figure 5D:
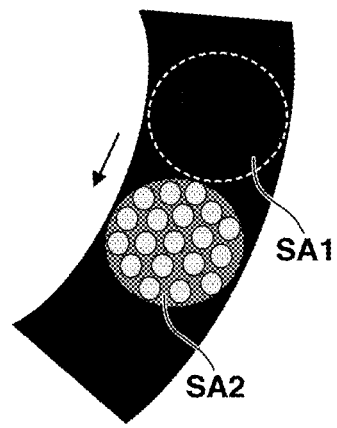
FIG. 5D illustrates an example of image processing according to the first exemplary embodiment.
Figure 5E:
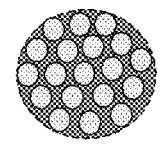
FIG. 5E illustrates an example of image processing according to the first exemplary embodiment.

In a case where the adaptive optics SLO 20 is used to observe photoreceptor cells C or measure a distribution of the photoreceptor cells C, the focus position is set in the vicinity of the outer retina (the boundary B5 illustrated in see FIG. 5A) to capture an image of an SLO image illustrated in FIG. 5B. On the other hand, a retinal blood vessel or a branched capillary blood vessel stretches in an inner retina (see the boundary B2 to the boundary B4 in FIG. 5A).

Almost 45% of the blood flowing in the blood vessel is blood cell components. Further, red blood cells are approximately 96% of the blood cell components and white blood cells are approximately 3%. The incident light is reflected by the retinal blood vessel if red blood cells are present at its irradiation position. Therefore, the SLO image includes a dark shadow (see Q in FIG. 5B or SA2 in FIG. 5C). On the other hand, the incident light can penetrate the retinal blood vessel and no shadow occurs if white blood cells are present at its irradiation position (see SA1 illustrated in FIG. 5C).

The light is reflected by red blood cells at the region where the blood vessel stretches in almost all the frames that constitute the SLO moving image. Therefore, the luminance value becomes lower. On the other hand, the luminance value of the photoreceptor cells C can be directly acquired in a frame that includes white blood cells.

For example, in a state of time t=n (see FIG. 5C), the photoreceptor cells C can be visually recognized because the incident light penetrates a micro region SA1 where white blood cells are present. On the other hand, the incident light is reflected by the retinal blood vessel and a shadow occurs in a micro region SA2 where red blood cells are present.

Figure 5F:
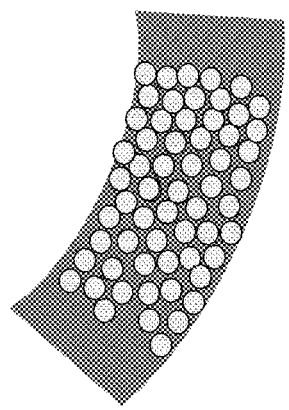
FIG. 5F illustrates an example of image processing according to the first exemplary embodiment.

Next, in a state of time T=n+1 (see FIG. 5D), the white blood cells C reach the micro region SA2 and new red blood cells flow into the micro region SA1. Therefore, the micro region SA1 has a low-luminance value and the micro region SA2 has a high-luminance value (i.e., a value equivalent to the luminance value of the photoreceptor cells C). Therefore, if a shadow occurs due to the presence of blood cells, it may be feasible to correct the shadow by selecting luminance values of the frames that include white blood cells along the region where the blood vessel stretches and combining the selected luminance values, as illustrated in FIG. 5F.

The shadow caused by blood cells is not limited to the outer retina. For example, when a lamina cribrosa of an optic nerve head is imaged, the incident light can reach the lamina cribrosa at a position where white blood cells are present in a thin blood vessel (e.g., a branched blood vessel) of the optic nerve head. Thus, observing the lamina cribrosa or measuring the shape of the lamina cribrosa is feasible.

It is conventionally known that the luminance value becomes lower in almost all the frames because a shadow occurs due to the presence of red blood cells in each pixel of a blood vessel region, in the observation or measurement of the photoreceptor cells C or the lamina cribrosa. Therefore, it was difficult to visually recognize or detect the photoreceptor cells C or the lamina cribrosa. Hence, in the region where a shadow occurs due to the presence of blood cells, the processing according to the present exemplary embodiment intends to i) generate an image that shows lesser influence of blood cells (i.e., an image easy to visually recognize or measure the cell or the tissue).

<Step S410>

The image acquisition unit 110 requests the adaptive optics SLO 20 to acquire the SLO moving image D and the fixation target position F. In this respect, the image acquisition unit 110 is functionally operable as an imaging control unit. In the present exemplary embodiment, the adaptive optics SLO 20 acquires the SLO moving image D by setting a parafovea of a macula as the fixation target position F and the outer retina as the focus position in the depth direction. The imaging target portion setting method is not limited to the above-described example.

For example, as described below, the adaptive optics SLO 20 can set the optic nerve head as the fixation target position and can set the lamina cribrosa position beneath the retina as the focus position in the depth direction. Further, it is useful to set the imaging target portion according to user settings and switch the operations to be performed by the identifying unit 131, the control unit 132, and the image processing unit 133. In this case, newly making the settings is unnecessary and accordingly user convenience can be improved.

The adaptive optics SLO 20 acquires the SLO moving image D and the fixation target position F in response to an acquisition request and transmits the acquired SLO moving image D and the fixation target position F to the image acquisition unit 110. The image acquisition unit 110 receives the SLO moving image D and the fixation target position F from the adaptive optics SLO 20 via the LAN 30. The image acquisition unit 110 stores the received SLO moving image D and the fixation target position F in the storage unit 120. In the present exemplary embodiment, it is presumed that the SLO moving image D is a moving image that has been already subjected to the registration processing applied to respective frames.

<Step S420>

The identifying unit 131 performs processing for identifying a blood cell region and a blood cell moving range on the SLO moving image D. More specifically, the identifying unit 131 performs identifying processing according to the following procedure.

In step S421, the identifying unit 131 calculates a temporal degree of dispersion in pixel value at each position of the SLO moving image D.

First, the identifying unit 131 generates a differential moving image based on a first frame and a second frame (i.e., two neighboring frames) of the SLO moving image D. The processing to be performed by the identifying unit 131 in this case is equivalent to subtracting the image illustrated in FIG. 5D from the image illustrated in FIG. 5C to obtain the image illustrated in FIG. 5E.

Obtaining the differential image is useful to extract information relating to the movement of blood cells from the moving image. Therefore, the accuracy in identifying the region relating to the movement of blood cells can be improved. The frames to be extracted to obtain the differential moving image are not limited to two neighboring frames. For example, in a case where the frame rate is sufficiently high, the identifying unit 131 can generate a differential moving image based on a predetermined number of frames to improve the efficiency in the processing.

Next, the identifying unit 131 calculates a statistics on luminance value relating to the frame direction at each x-y position of the differential moving image. For example, the identifying unit 131 can extract information derived from the movement of blood cells using a variance value that represents the temporal degree of dispersion in pixel value of the SLO moving image D.

In step S422, the identifying unit 131 identifies a region where the degree of dispersion is greater than a predetermined threshold value as a blood cell moving region. To this end, the identifying unit 131 identifies a region where the luminance variance is equal to or greater than a threshold value Tv at each x-y position of the differential moving image as the blood cell moving region.

Further, the identifying unit 131 identifies a frame image, if the pixel value is greater than a specific value at a specific position of the blood cell moving region, as a frame that indicates the position of blood cells at the specific position. In the above-described processing, the identifying unit 131 identifies a frame whose luminance value is a maximum value, at each x-y position of the blood cell moving region in the SLO moving image D, as a frame that includes white blood cells (i.e., a region in which the incident light can penetrate and no shadow occurs). Through the above-described processing, it becomes feasible to extract the region where white blood cells are present from each frame and obtain data required to form an image in the following image processing.

The blood cell identifying processing is not limited to the method employed in step S420. For example, it is useful to identify a high-luminance region of the differential moving image, if it is included in the blood cell moving region, as a blood cell region. In this case, the efficiency of the processing can be improved. Further, it is feasible to identify the region relating to the movement of blood cells based on a value obtainable by division of the luminance values of a plurality of frames.

<Step S430>

The image processing method determination unit 1321 determines an image correction method to be employed at each x-y position of the SLO image D. The image processing unit 133 generates a corrected SLO image in response to an instruction from the image processing method determination unit 1321. More specifically, first, the image processing method determination unit 1321 performs i) noise reduction processing applied to photoreceptor cell regions and ii) blood cell shadow removing or reducing processing. The image processing unit 133 performs image correction processing according to the method instructed by the image processing unit determination unit 1321.

In step S431, the image processing unit 133 selects a luminance value of the frame having the maximum luminance in the frame direction, as i) an image correction method to be employed at each x-y position of the blood cell moving region in the SLO moving image D identified in step S420, and forms an image using the selected luminance value (i.e., a pixel value). In short, the image processing unit 133 performs time-directional maximum intensity projection (MIP) processing in the blood cell moving region. The above-described processing is not limited to selecting the maximum value. The above-described processing can include outlier removal processing.

In step S432, the image processing unit 133 selects an average luminance value in the frame direction or in the time direction, as ii) an image correction method to be employed at each x-y position on the outside of the blood cell moving region of the SLO moving image D. In short, the image processing unit 133 performs averaging processing on the outside of the blood cell moving region.

The image correction method is not limited to the above-described example. Any other arbitrary correction method, if it is effective to remove the blood cell shadow, is employable. For example, the image processing unit 133 selects a luminance value having been averaged in the time direction for an assembly St of frames having luminance values equal to or greater than a threshold value Tp, at each x-y position of the SLO moving image D.

Further, the image processing unit 133 forms an image based on the obtained luminance value (i.e., the pixel value). The threshold value Tp is a standard luminance value in the imaging of the photoreceptor cells C. It is feasible to generate an SLO image that is robust against the influence of a misregistration between respective frames, compared to a case where the maximum luminance value to be selected relates to the frame direction as described in step S430.

<Step S440>

The output unit 134 displays the SLO moving image D together with the corrected SLO image generated in step S430 on the monitor 305. In this case, as another exemplary embodiment, it is useful to prepare a plurality of SLO images that have been corrected using different correction methods and display a graphic user interface (GUI) that includes a list of the prepared SLO images to enable a user to select a desired correction method. For example, it is feasible to realize a switching display by selecting the following correction methods i) to iii).

i) Obtaining an image by performing the maximum intensity projection processing in the blood cell moving region and performing the averaging processing on the outside of the blood cell moving region.

ii) Obtaining an image by averaging luminance values that are equal to or greater than the threshold value Tp in the blood cell moving region and performing the averaging processing on the outside of the blood cell moving region.

iii) Obtaining a time-directional maximum intensity projection image in the entire image. Thus, a user can select a correction method to obtain a desired image.

<Step S450>

The instruction acquisition unit 140 acquires an external instruction that indicates whether to store the SLO moving image D, the SLO image corrected in step S430, and the fixation target position F in the data server 40. For example, the external instruction can be input by an operator via the keyboard 306 or the mouse 307. If it is determined that the external instruction requests storing the acquired data (YES in step S450), the operation proceeds to step S460. If it is determined that the storage is not instructed (NO in step S450), the operation proceeds to step S470.

<Step S460>

The image processing apparatus 10 associates image information (including test date and time, bibliographic information that identifies the eye to be tested, and other bibliographic information (e.g., the fixation target position F), and the corrected SLO image) with the SLO moving image D. The output unit 134 transmits the associated image information to the data server 40 via the LAN 30.

<Step S470>

The instruction acquisition unit 140 acquires an external instruction that indicates whether to terminate the processing relating to the SLO moving image D to be performed by the image processing apparatus 10. The above-described instruction can be input by an operator via the keyboard 306 or the mouse 307. If it is determined that the acquired external instruction is a processing termination instruction (YES in step S470), the instruction acquisition unit 140 terminates analysis processing.

On the other hand, if it is determined that the acquired external instruction is a processing continuation instruction (NO in step S470), the processing returns to step S410. The image acquisition unit 110 performs processing for the next eye to be tested (or repeats the processing for the same eye).

According to the above-described configuration, the image processing apparatus 10 identifies the blood cell region included in the SLO moving image D, and performs image correction processing by selecting the luminance value of a frame that includes a high-luminance blood cell region at each x-y position of the identified blood cell region. Through the above-described processing, the image processing apparatus 10 generates an image that shows lesser influence of the shadow caused by the blood cells. Thus, it becomes feasible to generate and display an SLO image that includes visually recognizable cells and tissues even in a shadow region underlying the blood vessel where the incident light is blocked by the blood cells.

In the present exemplary embodiment, the image processing apparatus performs the image correction processing on an SLO image that includes photoreceptor cells C captured at a macula of a retina, to remove the influence of a shadow region that may be caused by blood cells. However, the claimed invention is not limited to the above-described example. For example, the image processing apparatus can perform image correction processing to remove the influence of a shadow region that may be caused by blood cells in a case where a tissue (e.g., the lamina cribrosa) that underlies the retina of the optic nerve head is imaged.

The lamina cribrosa (see LC illustrated in FIGS. 20B and 20C) is a disk-shaped tissue that underlies the retina of the optic nerve head. Numerous small pores, which are referred to as lamina cribrosa pores (see LP illustrated in FIG. 20 C), are present in the lamina cribrosa. The lamina cribrosa itself becomes a high-luminance region on an AO-SLO image because of the light reflected by the disk-shaped tissue. On the other hand, the blood cell shadow region or each lamina cribrosa pore becomes a low-luminance region. However, in a thin blood vessel of the optic nerve head, the incident light can reach the lamina cribrosa at the position where white blood cells are present. Therefore, observing the lamina cribrosa or measuring the shape of the lamina cribrosa becomes feasible.

An image processing apparatus according to a second exemplary embodiment performs registration processing for frames of an SLO moving image D and performs image correction processing with reference to the luminance value of a blood cell region identified by the identifying unit 131. Further, the image processing apparatus according to the second exemplary embodiment discriminates a deficient area of photoreceptor cells C from a shadow region caused by blood cells based on a change amount of the luminance value before and after the image correction processing. The output unit 134 displays a corrected SLO image together with a detected lesion region, as described below.

It is not easy to determine whether a low-luminance region of an SLO image, if it exists in a region where the blood vessel stretches, is a low-luminance region caused due to the influence of blood cells or a low-luminance deficient cell (or tissue) region, namely a region not relating to the reflection by the blood cells.

Hence, the image processing apparatus according to the second exemplary embodiment intends to improve the visibility and measuring capability in recognizing cells (or tissue) by determining whether the low-luminance region of an SLO image is a shadow caused by blood cells or a deficient cell (or tissue).

Thus, the image processing apparatus according to the second exemplary embodiment can accurately identify a blood cell region and can perform image correction processing with reference to the luminance value of a white blood cell region. Further, the image processing apparatus according to the second exemplary embodiment can detect and display a low-luminance deficient region of the photoreceptor cells C, to enable an operator to check an accurate distribution of cells (or tissue) or a lesion.

Figure 6:
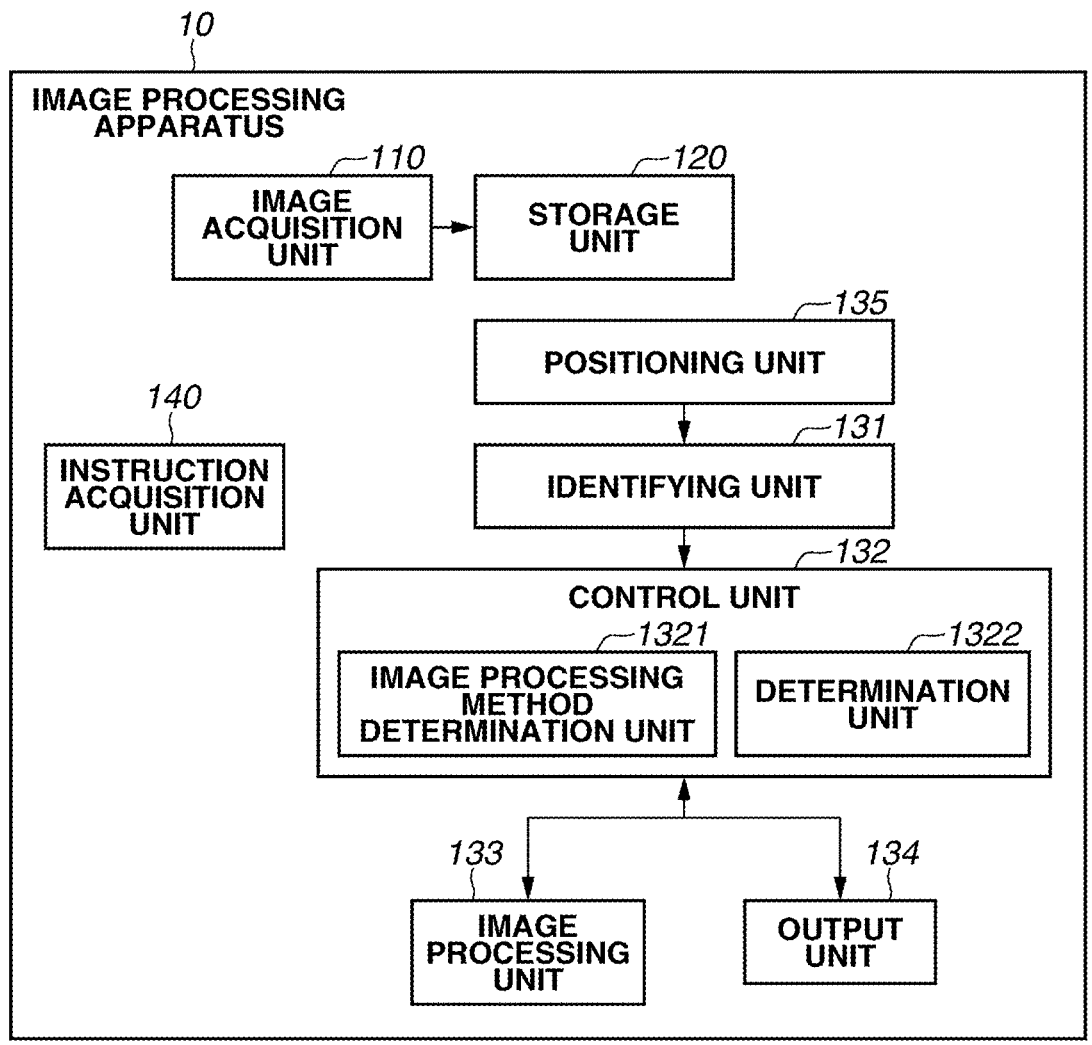
FIG. 6 illustrates an example configuration of an image processing apparatus according to a second exemplary embodiment.

FIG. 6 is a functional block diagram illustrating the image processing apparatus 10 according to the present exemplary embodiment. The image processing apparatus 10 illustrated in FIG. 6 is different from the apparatus illustrated in FIG. 1 in that a registration unit 135 is newly added and the control unit 132 includes a determination unit 1322. The determination unit 1322 is functionally operable as a deficiency determination unit configured to determine a deficient area of a tissue based on a fundus image obtainable through image processing independently applied to the identified region and a fundus image region different from the identified region.

Figure 7:
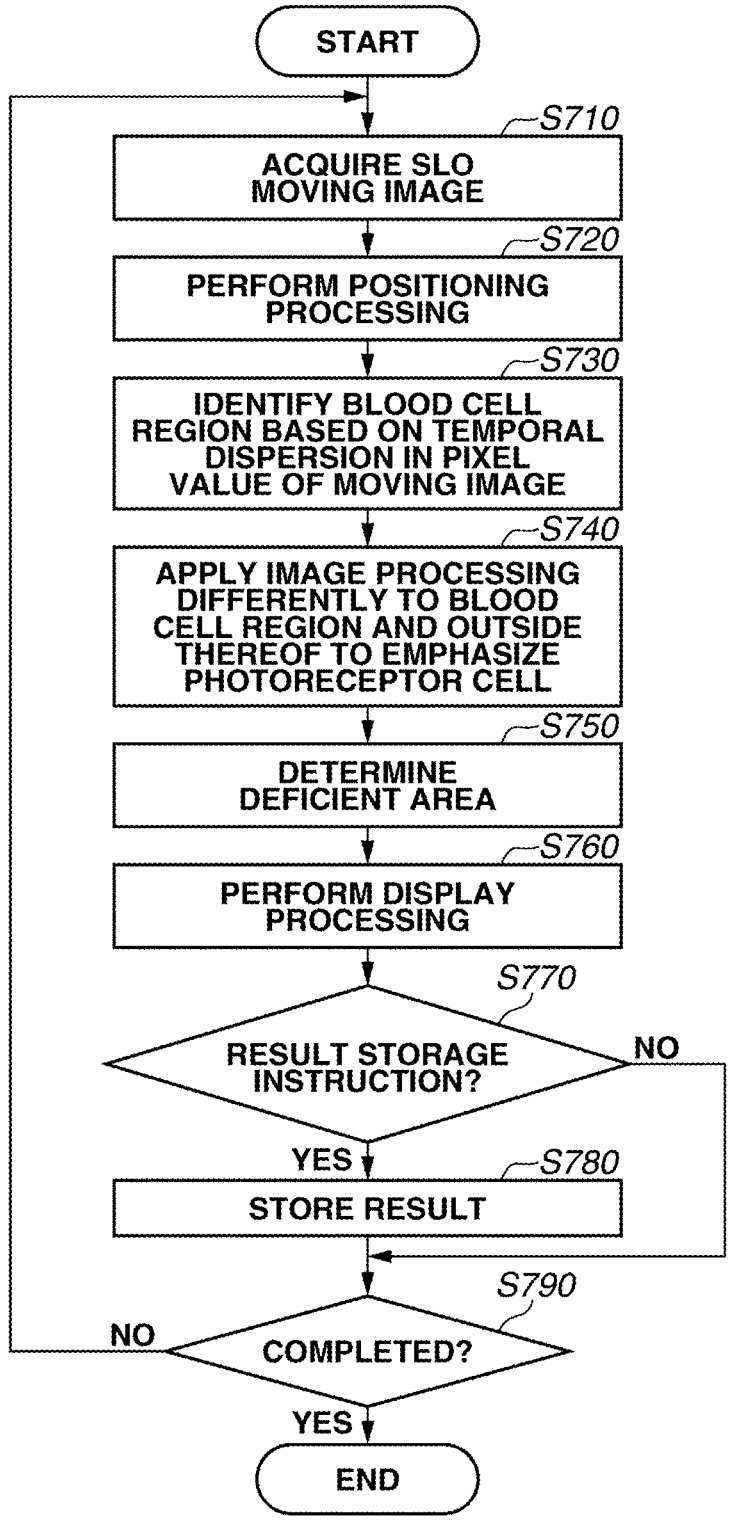
FIG. 7 is a flowchart illustrating an example of image processing that can be performed by the image processing apparatus according to the second exemplary embodiment.

FIG. 7 is a flowchart illustrating an example flow of the image processing that can be performed by the image processing apparatus 10 according to the present exemplary embodiment. An operation to be performed according to the flowchart illustrated in FIG. 7 is similar to the operation described in the first exemplary embodiment, except for step S720, step S750, and step S760. Hence, in the present exemplary embodiment, processing to be performed in step S720, step S750, and step S760 is described in detail below.

<Step S720>

The registration unit 135 reads the SLO moving image D from the storage unit 120 and performs registration processing for frames that constitute the SLO moving image D.

More specifically, the registration unit 135 performs the following processing i) through iii).

i) The registration unit 135 sets a reference frame as a reference for the registration processing. In the present exemplary embodiment, the registration unit 135 designates a frame having the smallest frame number as the reference frame. In this case, the reference frame setting method is not limited to the above-described example. For example, it is useful to acquire a reference frame number that has been designated by a user from the instruction acquisition unit 140 and set the reference frame.

ii) The registration unit 135 performs coarse registration processing to roughly determine the relative position of frames. Although any arbitrary registration method is usable, in the present exemplary embodiment, the registration unit 135 performs the coarse registration processing with a correlation coefficient as an inter-image similarity evaluation function and the Affine transform as a coordinate conversion method.

iii) The registration unit 135 performs fine registration processing based on the data representing rough positional correspondence of the frames.

In the present exemplary embodiment, the registration unit 135 performs fine inter-frame registration processing on the moving image having been subjected to the coarse registration processing, i.e., the moving image obtained in the above-described processing ii), using a Free Form Deformation (FFD) method, which is one of non-rigidity registration methods.

The fine registration processing method is not limited to the above-described example and any other arbitrary registration method is usable.

In the present exemplary embodiment, the registration unit 135 obtains a combination of registration parameters, according to which the entire frame of an SLO moving image D becomes most similar to a reference frame, using a pixel value based inter-image similarity. However, the claimed invention is not limited to the above-described example. For example, the registration unit 135 can detect image features (e.g., fovea centralis or branched blood vessel) of an observation target in each frame of the SLO moving image D. Further, the registration unit 135 can perform registration processing for respective frames of the SLO moving image D in such a way as to most accurately adjust the position with respect to the image features.

<Step S750>

The determination unit 1322 obtains information indicating the difference in luminance between an overlapping image of the SLO moving image D and the image corrected SLO image generated in step S740. In the present exemplary embodiment, the overlapping image is a two-dimensional image that possesses, as a pixel value, a mean luminance value of respective frames averaged in the time direction at each x-y position of the SLO moving image. The overlapping image can be obtained by adding respective frames of the SLO moving image D positioned by the determination unit 1322. The determination unit 1322 obtains a variation amount in the luminance at each x-y position, which can be obtained by applying differential processing on the overlapping image and the corrected SLO image, and determines whether the region is a shadow region caused by blood cells or a deficient area of photoreceptor cells C.

Figure 8A:
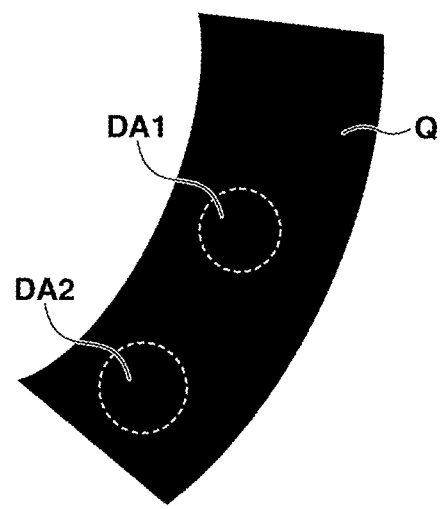
FIG. 8A illustrates an example of deficient area determination processing.
Figure 8B:
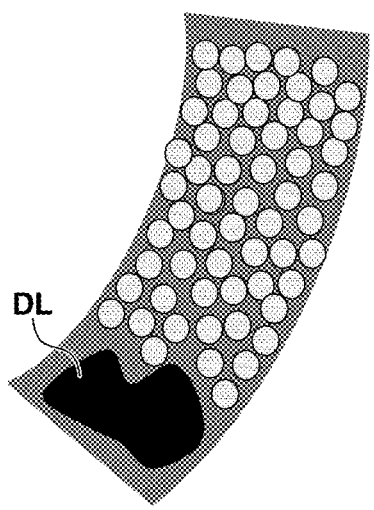
FIG. 8B illustrates an example of deficient area determination processing.

Almost all the blood cell components in the blood vessel are red blood cells. Therefore, in an overlapping image (see FIG. 8A), the luminance value becomes lower in a region where the blood vessel stretches. Therefore, in respective low-luminance regions (see DA1 and DA2 in FIG. 8A), it is difficult to determine whether there is any deficiency in the photoreceptor cells C. On the other hand, as illustrated in FIG. 8B, it is easy to identify a deficient area DL of photoreceptor cells C if the image has been subjected to correction processing applied to the shadow caused by blood cells. It is understood that the deficient area of photoreceptor cells C is concealed by the low-luminance region DA2 in FIG. 8A.

Hence, the determination unit 1322 identifies a blood vessel region based on the overlapping image. Further, the determination unit 1322 determines that a position in the blood vessel region is included in a shadow region caused by blood cells if, at the position, the dispersion in the luminance value (i.e., pixel value) is large and the maximum (i.e., peak) pixel value in the time direction greatly departs from an average value (i.e., an average level) of the pixel value in the time direction.

Further, the determination unit 1322 determines that a position in the blood vessel region is included in a deficient area if, at the position, the maximum pixel value in the time direction is close to the average value of the pixel value in the time direction. As described above, it is possible that the maximum value is a value having been subjected to the outlier removal processing. Further, a median or any other value representing a mean level in the pixel value is employable as the average value.

If it is determined that the luminance value of the overlapping image is less than a threshold value Ta and a variation amount in the luminance value, when the differential processing is applied to the overlapping image and the corrected SLO image, is equal to or greater than a threshold value Ts, the determination unit 1322 identifies the region as a shadow region caused by the blood cells. Further, if the luminance value of the overlapping image is less than the threshold value Ta and a variation amount in the luminance value is less than the threshold value Ts, the determination unit 1322 identifies the region as the deficient area DL of photoreceptor cells C.

<Step S760>

The output unit 134 displays the corrected SLO image and a deficiency candidate region of the photoreceptor cells C detected in step S750 on the monitor 305.

In the present exemplary embodiment, the output unit 134 displays, in addition to the corrected SLO image itself, an image that includes a colored region superimposed on the corrected SLO image in such a way as to represent the deficiency candidate region of the photoreceptor cells C. In this case, the display method is not limited to the above-described example and any other arbitrary display method is usable. For example, it is useful to superimpose a color frame surrounding the deficient area on the corrected SLO image or add an arrow pointing the deficient area. Alternatively, it is useful to select a display or a non-display of the color frame or the arrow indicating the deficient area on the corrected SLO image.

In the present exemplary embodiment, the image processing apparatus performs image correction processing on the shadow region of the SLO image that may be caused by blood cells when the photoreceptor cells C of a macula of the retina is imaged. Further, the image processing apparatus detects a photoreceptor cell deficient area and displays the detected deficient area. However, the claimed invention is not limited to the above-described example. For example, the image processing apparatus according to the present exemplary embodiment can perform image correction processing on a shadow region that may be caused by blood cells in a case where a tissue (e.g., lamina cribrosa) that underlies the retina of the optic nerve head is imaged and can detect and display a deficient area.

When the above-described configuration is employed for the image processing apparatus 10, the registration unit 135 performs inter-frame registration processing and the image processing unit 133 performs image correction processing on the shadow region caused by the blood cells. Further, the image processing apparatus 10 discriminates a deficient area of photoreceptor cells C from a shadow region caused by blood cells based on a change amount of the luminance value before and after the image correction processing. The output unit 134 displays a corrected SLO image together with a detected lesion region.

Thus, the image processing apparatus 10 can accurately identify a blood cell region with reference to a registration result and can perform image correction processing with reference to the luminance value of a white blood cell region. Further, the image processing apparatus 10 can detect and display a low-luminance deficient region of the photoreceptor cells C, to enable an operator to check an accurate distribution of cells (or tissue) or a lesion.

An image processing apparatus according to a third exemplary embodiment performs registration processing for frames of an SLO moving image D and performs image correction processing with reference to the luminance value of a blood cell region identified by the identifying unit 131. Further, the image processing apparatus according to the third exemplary embodiment detects photoreceptor cells C from a corrected SLO and measures a distribution of the photoreceptor cells. The image processing apparatus according to the third exemplary embodiment compares a calculated statistical quantity of the photoreceptor cell distribution with a normal value to detect a lesion candidate (i.e., a distribution abnormality region), as described below.

Thus, the image processing apparatus according to the third exemplary embodiment can accurately identify a blood cell region based on a registration result and can perform image correction processing with reference to the luminance value of a white blood cell region. Further, the image processing apparatus according to the third exemplary embodiment can measure a distribution of cells (or tissue) even in a shadow region caused by blood cells and can detect a lesion candidate (i.e., a distribution abnormality region).

Figure 9:
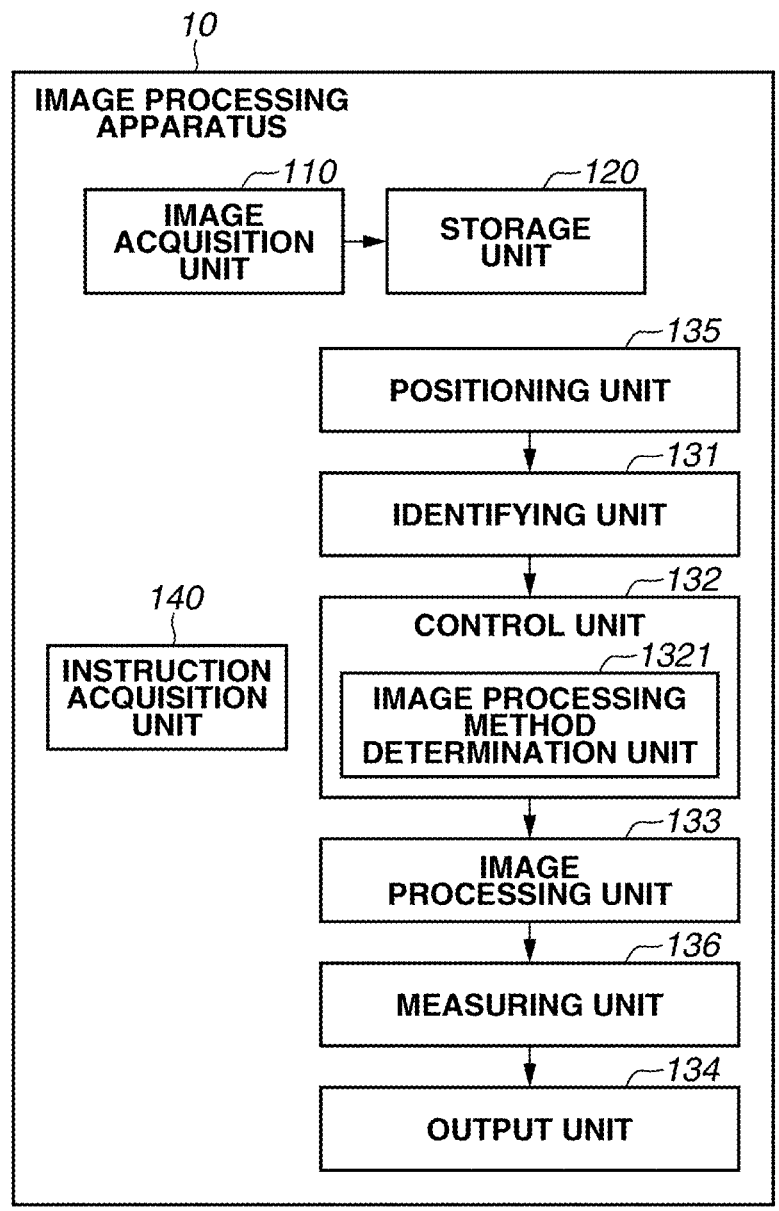
FIG. 9 illustrates an example configuration of an image processing apparatus according to a third exemplary embodiment.

FIG. 9 is a functional block diagram illustrating an example configuration of the image processing apparatus 10 according to the present exemplary embodiment. The image processing apparatus 10 illustrated in FIG. 9 is different from the apparatus described in the first exemplary embodiment in that the registration unit 135 and a measuring unit 136 are provided.

The measuring unit 136 can acquire information relating to a tissue from a fundus image and obtain the acquired information as the tissue information. In this respect, the measuring unit 136 is functionally operable as an acquisition unit configured to acquire tissue information in the present exemplary embodiment. Further, the control unit 132 is functionally operable as a change unit configured to change at least one of a cell (or tissue) detection method, a shape measurement method, and a distribution measurement method based on at least one of the position, luminance, and shape of the identified region.

Figure 10:
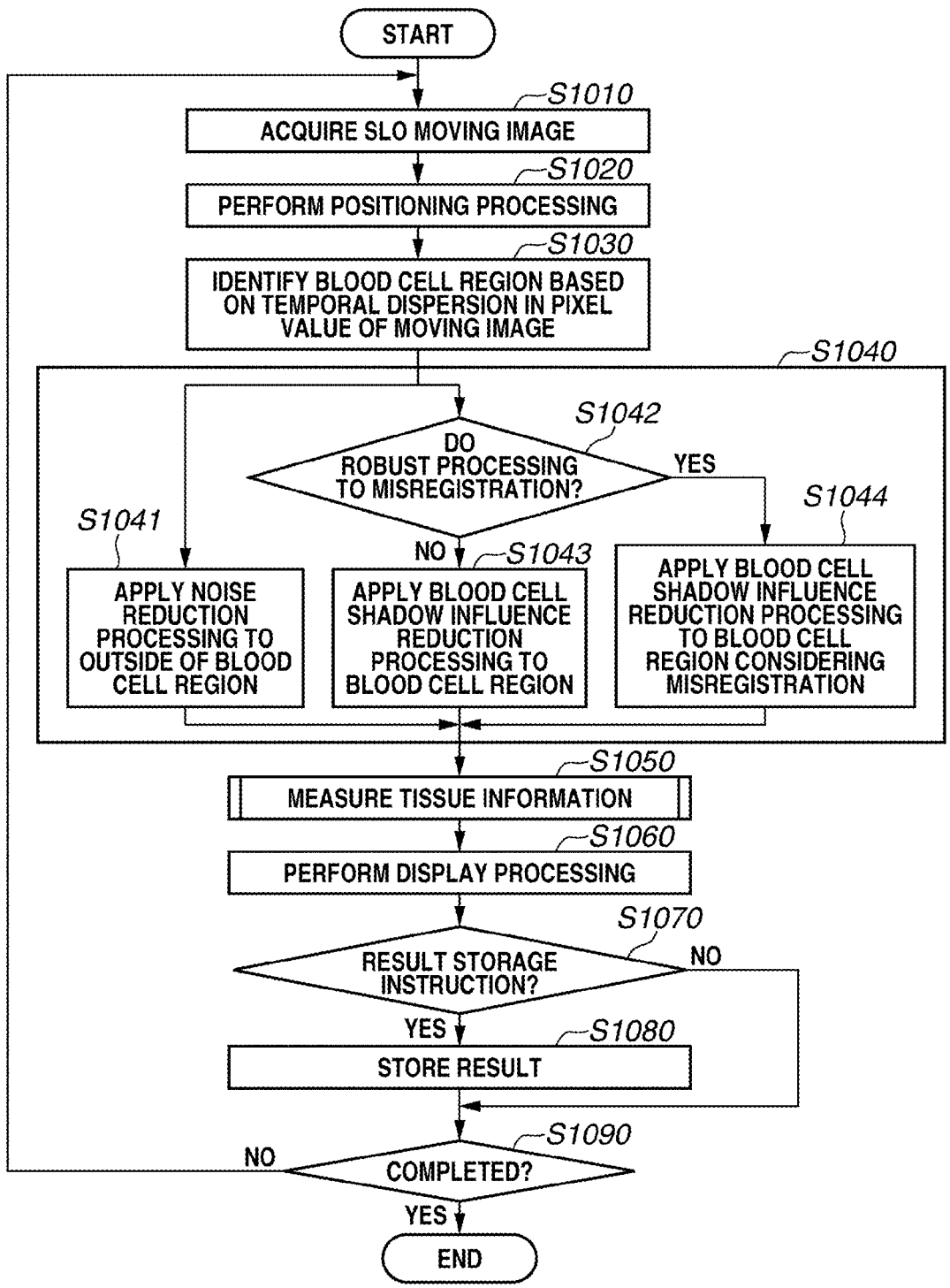
FIG. 10 is a flowchart illustrating an example of image processing that can be performed by the image processing apparatus according to the third exemplary embodiment.

FIG. 10 is a flowchart illustrating an example flow of the image processing that can be performed by the image processing apparatus 10 according to the present exemplary embodiment. An operation to be performed according to the flowchart illustrated in FIG. 10 is similar to the operation described in the first exemplary embodiment, except for step S1040, step S1050, and step S1060. Hence, in the present exemplary embodiment, processing to be performed in step S1040, step S1050, and step S1060 is described in detail below.

<Step S1040>

In step S1040, the image processing unit 133 performs processing for emphasizing photoreceptor cells by applying image processing differently to the blood cell region and the outside thereof according to a control signal of the control unit 132. The processing to be performed in step S1040 includes processing in the following steps S1041 to S1044.

In step S1041, the image processing unit 133 performs noise reduction processing to be applied to the outside of the blood cell region. The processing to be performed in step S1041 is similar to the processing performed in step S431 described in the first exemplary embodiment.

In step S1042, the control unit 132 selects processing to be applied to the blood cell region. In this step, the control unit 132 determines whether to perform image processing considering the influence of misregistration of the moving image in the blood cell region. In determining whether to correct the influence of misregistration, it is useful to refer to various types of information. For example, setting information input via the operation unit 50 according to a user operation is usable to enable the user to obtain a desired image.

Further, the control unit 132 calculates a difference between frames of the moving image and, if it is determined that a movement component is greater than a predetermined level, the control unit 132 selects image processing capable of correcting the influence of misregistration. In other cases, the control unit 132 selects ordinary processing. Through the above-described processing, the user can obtain an appropriate image without deteriorating user convenience.

In step S1043, namely in a case where the image processing that does not correct any influence of misregistration is selected, the image processing unit 133 applies image processing to the blood cell region. The processing to be performed in step S1043 is similar to the processing performed in step S432 described in the first exemplary embodiment.

In step S1044, the image processing apparatus performs image processing considering the influence of misregistration. The image processing unit 133 selects a mean luminance value of the assembly St of frames having luminance values equal to or greater than the threshold value Tp, at each x-y position of the SLO moving image D. The threshold value Tp is a setting value indicating a standard luminance value in the imaging of the photoreceptor cells C. It is feasible to generate an SLO image that is robust against the influence of a misregistration between respective frames, compared to a case where the maximum luminance value to be selected relates to the frame direction as described in step S430.

<Step S1050>

Figure 12:
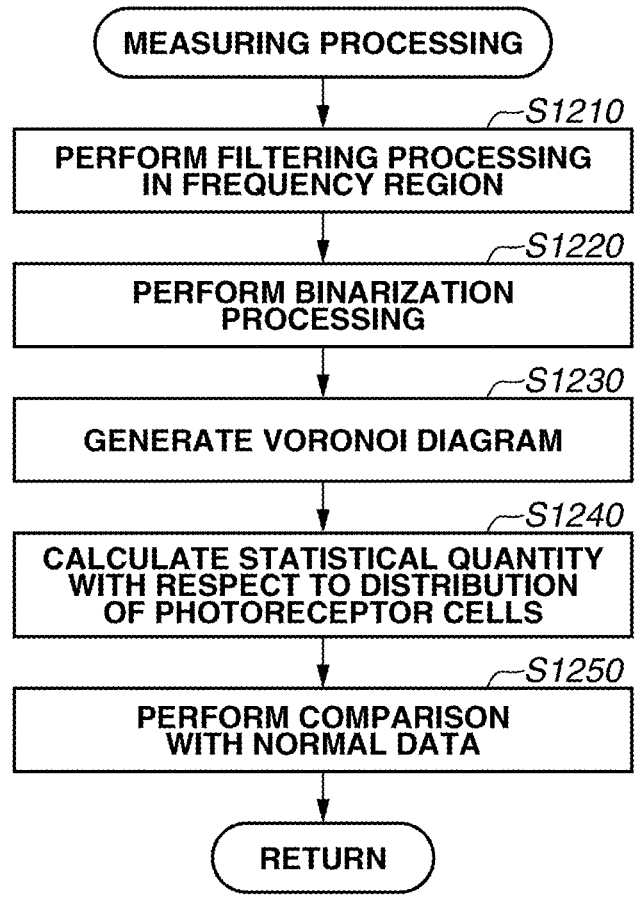
FIG. 12 is a flowchart illustrating details of tissue related information measuring processing.

The measuring unit 136 detects photoreceptor cells C from the SLO image corrected in step S1040 and measures a distribution of photoreceptor cells C. Further, the measuring unit 136 detects a distribution abnormality region based on a comparison between the distribution of photoreceptor cells C and a normal value. The processing to be performed in step S1050 is described in detail below with reference to a flowchart illustrated in FIG. 12.

<Step S1060>

The output unit 134 displays i) the corrected SLO image, ii) a detection result of photoreceptor cells C (i.e., a photoreceptor cell position map), iii) the Voronoi diagram, and iv) a map relating to a statistical value of the photoreceptor cell distribution for each micro region on the monitor 305. The output unit 134 gives a unique color to each Voronoi region with reference to the size of each area in the Voronoi diagram to be displayed in this case.

Figure 11:
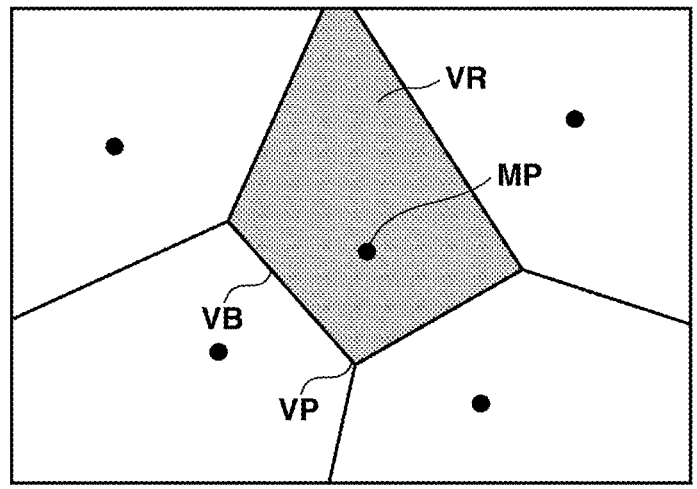
FIG. 11 illustrates an example of the image processing according to the third exemplary embodiment.

Further, if the measurement value relating to each Voronoi region or the statistical value for each micro region is not included in a normal value range, a corresponding region is colored with a specific color designated beforehand as a color indicating distribution abnormality in iii) the Voronoi diagram or iv) the statistical value map to be displayed in this case. Next, the processing to be performed in step S1050 is described in detail below with reference to flowcharts illustrated in FIG. 11 and FIG. 12.

<Step S1210>

The measuring unit 136 performs high-frequency component removal processing to remove peak components (e.g., noises and the light reflected from a fundus tissue) other than the photoreceptor cells from the corrected SLO image. In the present exemplary embodiment, the measuring unit 136 performs frequency conversion processing based on the Fast Fourier Transform (FFT) and applies a low-pass filter to cut high-frequency components of the signal. Then, the measuring unit 136 performs inverse Fourier transform processing on a filtered SLO image to obtain a spatial image. Finally, the measuring unit 136 generates a corrected SLO image that does not include any high-frequency components.

<Step S1220>

The measuring unit 136 performs binarization processing on the corrected SLO image generated in step S1210 with a threshold value Tb to detect photoreceptor cells C.

<Step S1230>

The measuring unit 136 performs the following processing to generate a Voronoi diagram based on a binary image of the photoreceptor cells C detected in step S1220. More specifically, the measuring unit 136 identifies a central point (see MP illustrated in FIG. 11) of each photoreceptor cell region on the binary image of the photoreceptor cells C, and draws a perpendicular bisector of a line segment connecting neighboring central points MP.

The measuring unit 136 obtains a Voronoi boundary VB by leaving a part of each drawn perpendicular bisector that extends from the midpoint of the line segment connecting neighboring central points MP to a point VP where two perpendicular bisectors intersect with each other while deleting the rest of the perpendicular bisectors. In the Voronoi diagram, an area occupied by respective photoreceptor cells C or the shape thereof can be represented by a region VR surrounded by the Voronoi boundary VB.

<Step S1240>

The measuring unit 136 calculates statistical quantities relating to the distribution of photoreceptor cells C based on the Voronoi diagram generated in step S1230. More specifically, the statistical quantities obtained by the measuring unit 136 in this case include the density of the detected photoreceptor cells C, a mean distance between neighboring photoreceptor cells, an average value with respect to the area occupied by a single photoreceptor cell, and the rate of a hexagonal region representing the photoreceptor cells C in the Voronoi diagram. The measuring unit 136 obtains the above-described statistical quantities not only for the entire image but also for each micro region.

<Step S1250>

The measuring unit 136 requests the data server 40 to transmit normal data relating to the distribution of photoreceptor cells C. The image acquisition unit 110 acquires the normal data and stores the acquired normal data in the storage unit 120.

The measuring unit 136 compares each statistical quantity relating to the photoreceptor cell distribution calculated in step S1240 with the normal data. If the statistical quantity is not included in a normal value range, the measuring unit 136 detects the region as a photoreceptor cell distribution abnormality region.

In the present exemplary embodiment, the target with respect to the measurement of the shape and the distribution of photoreceptor cells C is the macula of the retina. However, the claimed invention is not limited to the above-described example. For example, the image processing apparatus can perform image correction processing on a shadow region that may be caused by blood cells when a tissue (e.g., the lamina cribrosa) that underlies the retina of the optic nerve head is imaged, and can measure the shape and the distribution of lamina cribrosa pores.

When the above-described configuration is employed, the image processing apparatus 10 performs registration processing for frames of the SLO moving image D and performs image correction processing with reference to the luminance value of the blood cell region identified by the identifying unit 131. Further, the image processing apparatus 10 detects photoreceptor cells C from the corrected SLO and measures the distribution of the photoreceptor cells. The image processing apparatus 10 compares a calculated statistical quantity of the photoreceptor cell distribution with the normal value to detect a lesion candidate region.

Thus, the image processing apparatus according to the present exemplary embodiment can accurately identify a blood cell region based on a registration result and can perform image correction processing with reference to the luminance value of a white blood cell region. Further, the image processing apparatus according to the present exemplary embodiment can measure a distribution of cells (or tissue) even in a shadow region caused by blood cells and can detect a lesion candidate.

Further, the measuring unit 136 can be configured to measure a deficient cell region described in the second exemplary embodiment.

An image processing apparatus according to a fourth exemplary embodiment measures the shape and the distribution of photoreceptor cells C while changing an image processing parameter, without performing any image correction processing on a shadow region caused by blood cells.

More specifically, a measurement method setting unit 1323 sets an image processing parameter to be applied to a blood cell shadow region based on the luminance value of a shadow region caused by blood cells in the SLO image D and the measuring unit 136 measures the shape and the distribution of photoreceptor cells C, as described below.

Thus, the image processing apparatus according to the fourth exemplary embodiment can realize the measurement in the shadow region caused by blood cells while changing the image processing parameter. Further, the image processing apparatus according to the fourth exemplary embodiment can measure the shape and the distribution of cells (or tissue) even in the shadow region caused by blood cells.

Figure 13:
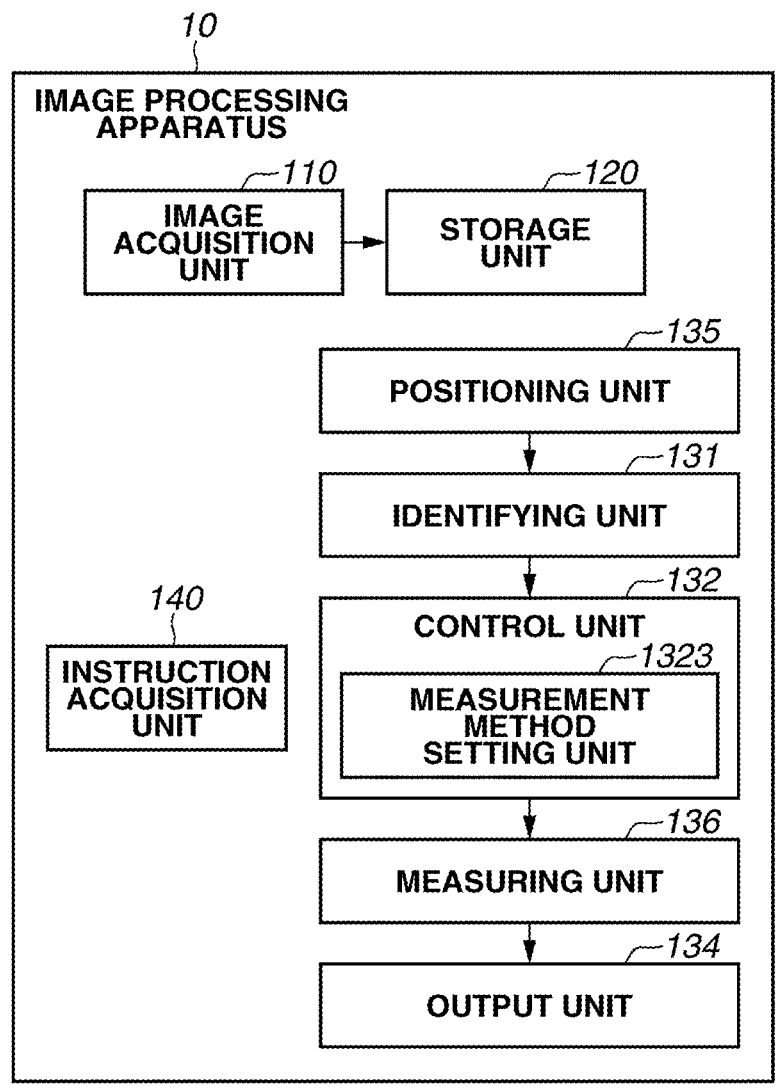
FIG. 13 illustrates an example configuration of an image processing apparatus according to a fourth exemplary embodiment.

FIG. 13 is a functional block diagram illustrating the image processing apparatus 10 according to the present exemplary embodiment. The image processing apparatus 10 illustrated in FIG. 13 is different from the apparatus described in the third exemplary embodiment in that the image processing method determination unit 1321 and the image processing unit 133 are excluded and the control unit 132 includes the measurement method setting unit 1323.

Figure 14:
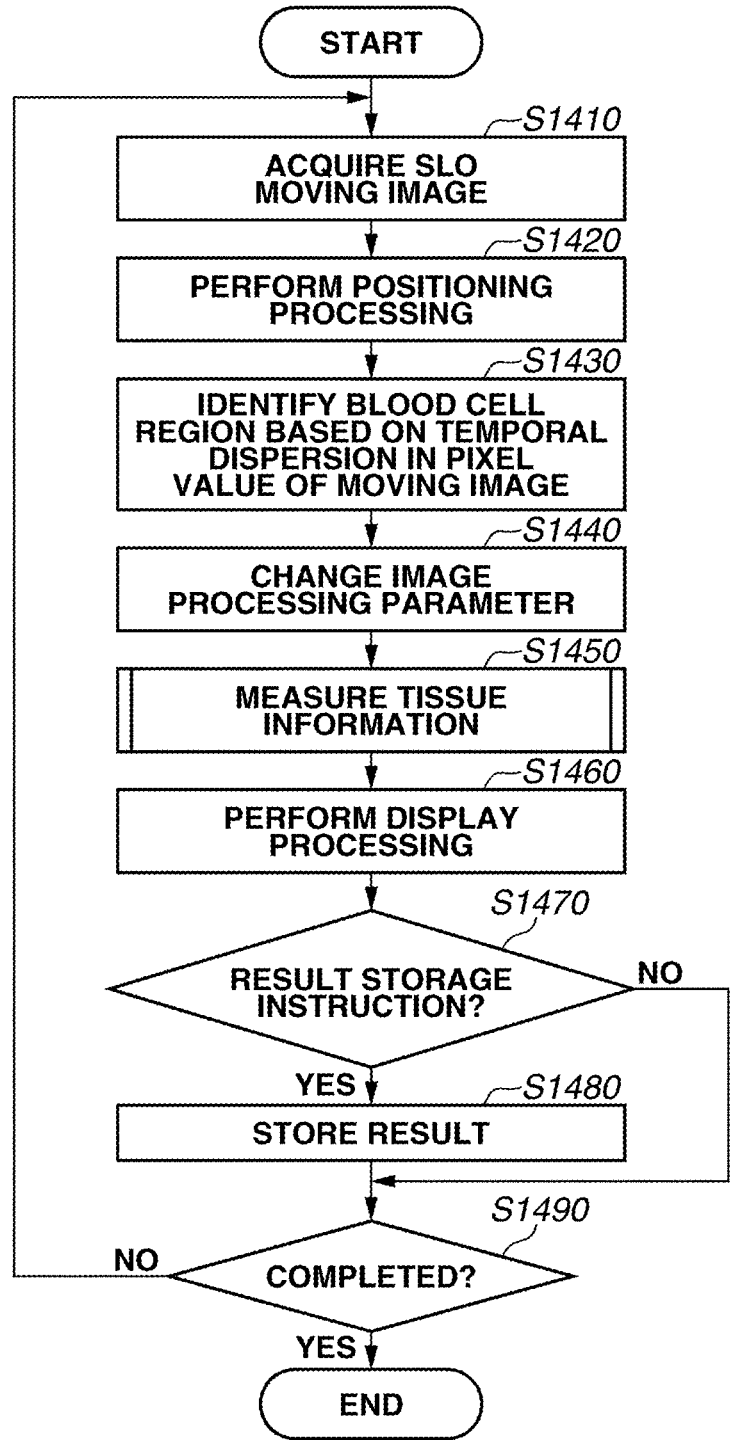
FIG. 14 is a flowchart illustrating an example of image processing that can be performed by the image processing apparatus according to the fourth exemplary embodiment.

FIG. 14 is a flowchart illustrating an example flow of the image processing that can be performed by the image processing apparatus 10 according to the present exemplary embodiment. An operation to be performed according to the flowchart illustrated in FIG. 14 is similar to the operation described in the third exemplary embodiment, except for step S1430, step S1440, and step S1450. Hence, in the present exemplary embodiment, processing to be performed in step S1430, step S1440, and step S1450 is described in detail below.

<Step S1430>

The identifying unit 131 performs processing for identifying a blood cell moving region in the SLO moving image D. The processing to be performed by the identifying unit 131 in this step is similar to the processing i) to iii) of step S420 described in the first exemplary embodiment and therefore the detailed description thereof is not repeated.

<Step S1440>

When the measuring unit 136 detects a tissue, the control unit 132 sets the image processing parameter in such a way as to differentiate a threshold value to be applied to the blood cell moving region from a threshold value to be applied to a region that is different from the blood cell moving region. In other words, the control unit 132 changes the threshold value Tb to be used in the photoreceptor cell detection in the following manner More specifically, the control unit 132 instructs the measuring unit 136 to use a threshold value Tc, which can be obtained by multiplying Tb by (luminance value in blood cell moving region)/(mean luminance value in photoreceptor cell region), in the photoreceptor cell detection.

<Step S1450>

The measuring unit 136 measures the shape and the distribution of photoreceptor cells C in the shadow region caused by blood cells, using the image processing parameter having been set in step S1440.

More specifically, the measuring unit 136 performs Voronoi division processing applied to the photoreceptor cells C detected in step S1450 and calculates a statistical quantity relating to the distribution of photoreceptor cells C. A method to be employed in step S1450 for the Voronoi division processing and the calculation of the statistical quantity relating to the distribution of photoreceptor cells C is similar to the method described in the third exemplary embodiment and therefore the detailed description thereof is not repeated.

In step S1460, the output unit 134 displays the measured information on the display unit 60.

In the present exemplary embodiment, the image processing apparatus measures the shape and the distribution of photoreceptor cells C that are present at a macula of a retina. However, the claimed invention is not limited to the above-described example.

For example, the image processing apparatus can measure the shape and the distribution of lamina cribrosa pores that are present in a shadow region caused by blood cells that may be caused when a lamina cribrosa underlying a retina of an optic nerve head is imaged, by changing the image processing parameter. When the above-described configuration is employed, the image processing apparatus 10 can measure the shape and the distribution of photoreceptor cells C in a shadow region caused by blood cells while changing the image processing parameter.

Thus, performing measurement processing in a shadow region caused by blood cells while changing the image processing parameter is effective to measure the shape and the distribution of cells (or tissue) in the shadow region caused by blood cells.

An image processing apparatus according to a fifth exemplary embodiment is different from the apparatus in the above-described exemplary embodiment in excluding exceptional frames (e.g., blinking or fixation disparity) before performing the image correction processing and measuring the distribution and the shape of photoreceptor cells C.

The image processing unit 10 includes an exceptional frame determination unit 1351 configured to determine a target frame image to be subjected to SLO moving image D processing based on image information. More specifically, the exceptional frame determination unit 1351 determines an exceptional frame based on the luminance value of each frame, an image deformation amount, an S/N ratio, and a displacement relative to a reference frame when the SLO image D is subjected to the inter-frame registration processing.

The image processing method control unit 1321 instructs performing the image correction processing using the luminance value of a high-luminance blood cell region other than the exceptional frame. The image processing unit 133 generates a corrected SLO image. Further, the measuring unit 136 measures the shape and the distribution of photoreceptor cells C included in the corrected SLO image, as described below.

Thus, the image processing apparatus according to the fifth exemplary embodiment can accurately identify a blood cell region even if an exceptional frame is included in an SLO image and can measure the shape and the distribution of cells (or tissue) while performing the image correction processing using the luminance value of a high-luminance blood cell region.

Figure 15:
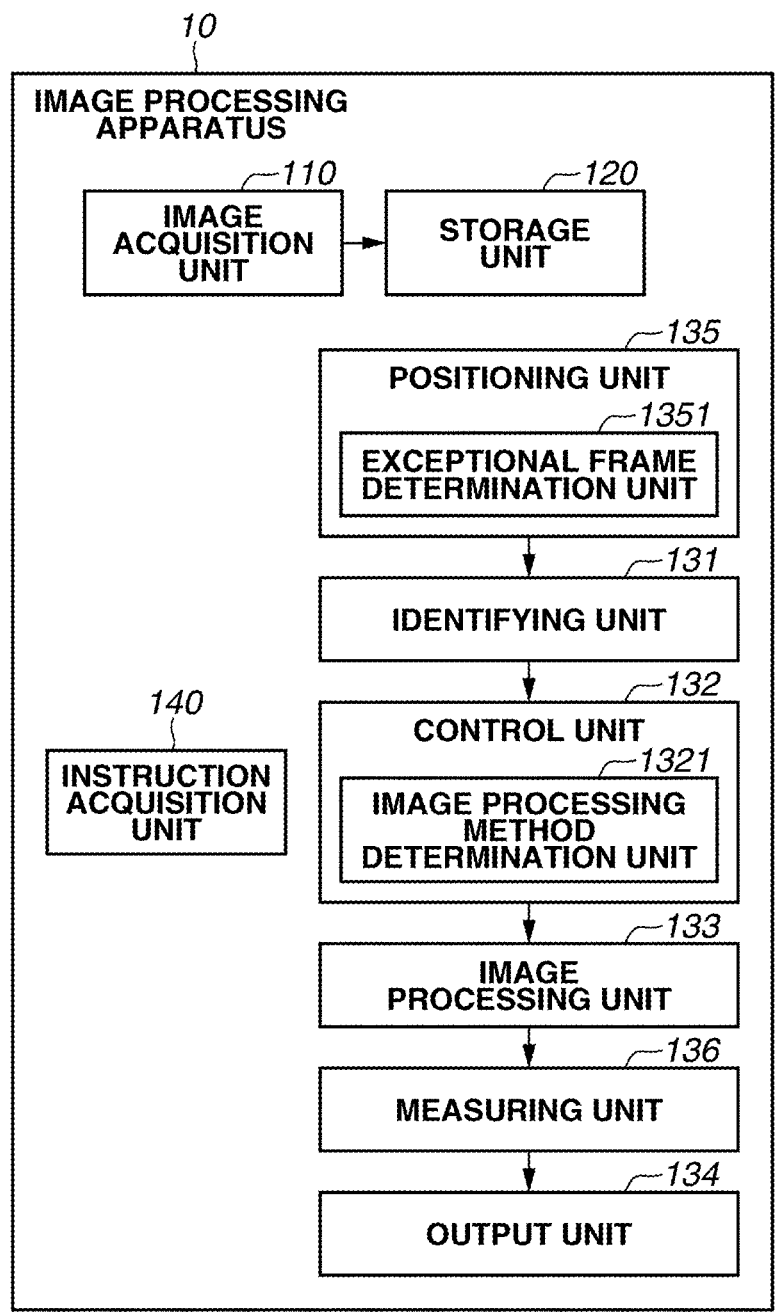
FIG. 15 illustrates an example configuration of an image processing apparatus according to a fifth exemplary embodiment.

FIG. 15 is a functional block diagram illustrating the image processing apparatus 10 according to the present exemplary embodiment. The image processing apparatus 10 illustrated in FIG. 15 is different from the apparatus described in the third exemplary embodiment in that the registration unit 135 includes the exceptional frame determination unit 1351.

Figure 16:
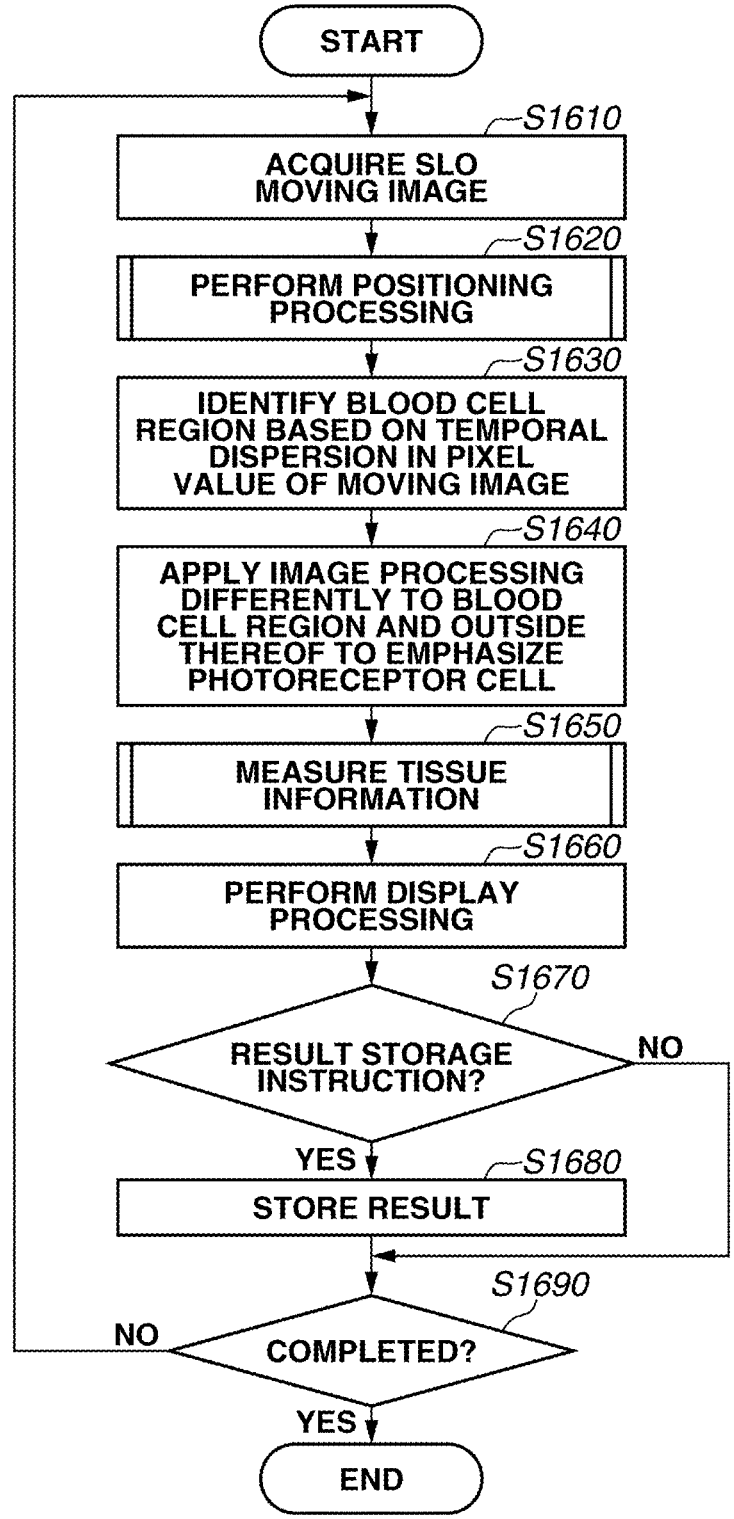
FIG. 16 is a flowchart illustrating an example of image processing that can be performed by the image processing apparatus according to the fifth exemplary embodiment.

FIG. 16 is a flowchart illustrating an example flow of the image processing that can be performed by the image processing apparatus 10 according to the present exemplary embodiment. An operation to be performed according to the flowchart illustrated in FIG. 16 is similar to the operation described in the third exemplary embodiment, except for step S1620. Hence, in the present exemplary embodiment, processing to be performed in step S1620 is described in detail below.

<Step S1620>

The registration unit 135 performs inter-frame registration processing on the SLO moving image D.

First, the exceptional frame determination unit 1351 performs exceptional frame determination processing to be applied to a single frame, and the registration unit 135 selects a reference frame. Next, the registration unit 135 performs coarse registration processing based on the Affine conversion and then performs fine registration processing using a conventionally known non-rigidity registration method. Finally, the exceptional frame determination unit 1351 performs exceptional frame determination processing on the registration completed SLO moving image.

Figure 17:
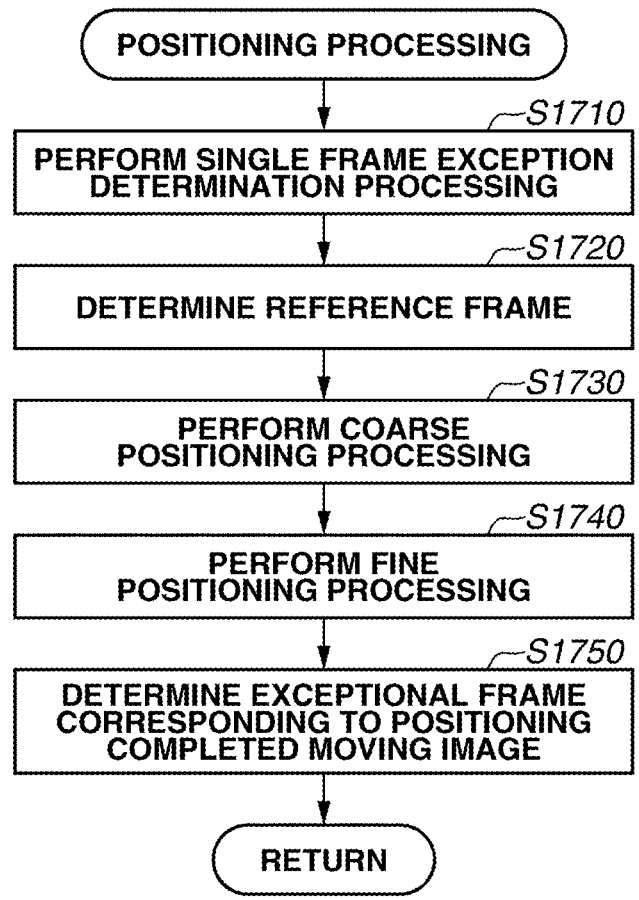
FIG. 17 is a flowchart illustrating details of AOSLO moving image registration processing.

Next, the processing to be performed in step S1620 is described in detail below with reference to a flowchart illustrated in FIG. 17.

Processing to be performed in step S1720, step S1730, step S1740 is similar to the processing performed in step S720 described in the second exemplary embodiment and therefore the detailed description thereof is not repeated.

<Step S1710>

The exceptional frame determination unit 1351 performs exception determination processing to be applied to a single frame.

The exceptional frame determination unit 1351 acquires a mean luminance value Ai and a blood vessel region Vi at each frame Di as image features from the SLO image D. The blood vessel region acquisition method is not limited to a specific one. Any arbitrary blood vessel extraction method, which is conventionally known, is employable. In the present exemplary embodiment, the luminance value of a blood vessel region to be acquired is equal to or less than a threshold value T1. Further, the exceptional frame determination unit 1351 acquires an intersectional region Cin (n=1, ..., n4>=3) of points in a row Bim (m=1, 2, ..., n3) that can be obtained by thinning the blood vessel region Vi.

The exceptional frame determination unit 1351 detects exceptional frames from each frame Di of the SLO moving image D. The exceptional frames to be detected in this case include a frame whose luminance is extremely low due to blinking, a frame including an image deformation due to involuntary eye movement during fixation, and a frame having a low S/N ratio due to defective aberration correction.

In the present exemplary embodiment, if the mean luminance value Ai is equal to less than a threshold value T2, the exceptional frame determination unit 1351 regards the frame Di of the SLO moving image D as having luminance abnormality due to blinking and determines that the frame is an exceptional frame. Further, if the difference between neighboring frames is equal to or greater than a threshold value T3 in a sum of squares with respect to the distance between the blood vessel intersectional regions Cin, the exceptional frame determination unit 1351 regards the frame as including an image deformation caused by the involuntary eye movement and determines that the frame is an exceptional frame. Further, if the S/N ratio is equal to or less than a threshold value T4, the exceptional frame determination unit 1351 regards the aberration correction as being defective and determines that the frame is an exceptional frame.

The exceptional frame determination method is not limited to the above-described example and therefore any other arbitrary exception determination method is usable. For example, it is useful to calculate a statistics on luminance value (e.g., an average value, a most frequent value, or a maximum value) of a differential image that can be obtained by performing differential processing on respective frames and, if the calculated statistics on luminance value is equal to or less than a threshold value T5, regard the frame as including a blur having occurred due to a movement of the subject and determines that the frame is an exceptional frame.

<Step S1750>

The exceptional frame determination unit 1351 performs exceptional frame determination processing to be applied to the fine registration completed SLO image generated in step S1740.

More specifically, the exceptional frame determination unit 1351 calculates a displacement between an image feature (e.g., the blood vessel intersectional region Cin) in the reference frame having been set in step S1720 and an image feature in a nonreference frame, and determines a frame whose displacement is greater than a permissible value as an exceptional frame. A displacement vector (x, y, theta, sx, sy) defined in the present exemplary embodiment has components of translation (x, y), rotation theta, and enlargement rate (sx, sy) as a displacement relative to the reference frame. If at least one of x>Tx, y>Ty, theta>Ttheta, sx>Tsx, and sy>Tsy is satisfied, the exceptional frame determination unit 1351 determines that the frame is an exceptional frame.

The definition of the displacement is not limited to the above-described example. For example, any arbitrary value (e.g., scalar quantity or vector quantity) is usable if it indicates the degree of displacement. For example, it is useful to define the rate of a reference region serving as an observation/measurement target in each frame, which can be represented by (entire area of reference region)/(area of reference region included in each frame Di), as a displacement.

In the following step S1640, to identify a region where a temporal variance of the pixel value is greater than a specific threshold value as a region relating to the movement of blood cells in the SLO moving image D, the identifying unit 131 excludes a frame image, if it is determined that the frame image is not a processing target before measuring the above-described variance. Thus, the variance value measurable in this case is less influenced by a factor other than the movement of blood cells. The blood cell moving region can be accurately identified.

Further, in the following step S1640, the image processing unit 133 removes exceptional frames from a frame image to be used in the image processing applied independently to the blood cell moving region and the outside thereof. Thus, it becomes feasible to obtain a clear image of photoreceptor cells.

In the present exemplary embodiment, the image processing apparatus measures the shape and the distribution of photoreceptor cells C that are present at a macula of a retina. However, the claimed invention is not limited to the above-described example. For example, the image processing apparatus can identify and exclude any exceptional frame before the apparatus measures the shape and the distribution of lamina cribrosa pores in a shadow region that may be caused by blood cells when a lamina cribrosa underlying a retina of an optic nerve head is imaged.

When the above-described configuration is employed, the image processing apparatus 10 excludes exceptional frames (e.g., blinking or fixation disparity) and performs image correction processing on remaining frames, and then measures the distribution and the shape of photoreceptor cells C. Thus, the image processing apparatus 10 can accurately identify a blood cell region even if an exceptional frame is included in an SLO image and can measure the shape and the distribution of cells (or tissue) while performing the image correction processing using the luminance value of a high-luminance blood cell region.

When a fundus image includes a blood vessel, white blood cells are entirely surrounded by red blood cells if the blood vessel is thick. In this case, the incident light tends to be reflected by red blood cells. Further, the incident light tends to be reflected by red blood cells at an intersectional region of blood vessels. The probability increases with increasing number of intersections. Therefore, due to the presence of a shadow caused by red blood cells, it becomes difficult to visually recognize or directly measure the shape of cells (or tissue).

Hence, an image processing apparatus according to a sixth exemplary embodiment intends to prevent the reliability of measurement values relating to the shape and the distribution of cells (or tissue) from decreasing. To this end, the image processing apparatus according to the sixth exemplary embodiment excludes a measurement error occurring region (e.g., a region in which the blood vessel diameter is large or a region in which blood vessels intersect) beforehand from a measurement target region, and then measures the distribution and the shape of lamina cribrosa pores, as described below.

More specifically, the image acquisition unit 110 acquires an SLO image DI that has been captured in a state where the focus position is set in the vicinity of an inner retina and an SLO image DO that has been captured in a state where the focus position is set in a region underlying the retina beforehand. The exceptional frame determination unit 1351 identifies exceptional frames in an inter-frame registration processing applied to the SLO image DI and the SLO image DO. The identifying unit 131 identifies blood cell moving regions included in both images (DI, DO).

The shape feature acquisition unit 1324 identifies a region MS including a larger blood vessel diameter VW or an intersectional region on the SLO image DI. The control unit 132 determines whether to perform at least one of detection processing, shape measurement processing, and distribution measurement processing to be applied to the cells (or tissue) in the identified region, based on the position or the shape of the identified region.

The image processing unit 133 corrects the SLO image DO based on the luminance value of a high-luminance blood cell region other than the exceptional frames. Further, after the control unit 132 instructs excluding the region MS including the larger blood vessel diameter VW or the intersectional region identified by the shape feature acquisition unit 1324 from the measurement target, the measuring unit 136 performs detection and shape/distribution measurement of lamina cribrosa pores LP in the corrected SLO image, as described below.

Thus, the image processing apparatus according to the sixth exemplary embodiment can accurately measure the shape and the distribution of cells (or tissue) because the measurement is performed after any region where measurement errors may occur is excluded from the measurement target.

Figure 20A:
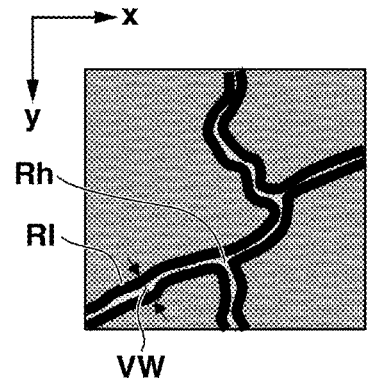
FIG. 20A illustrates example contents of the image processing according to the sixth exemplary embodiment.
Figure 20B:
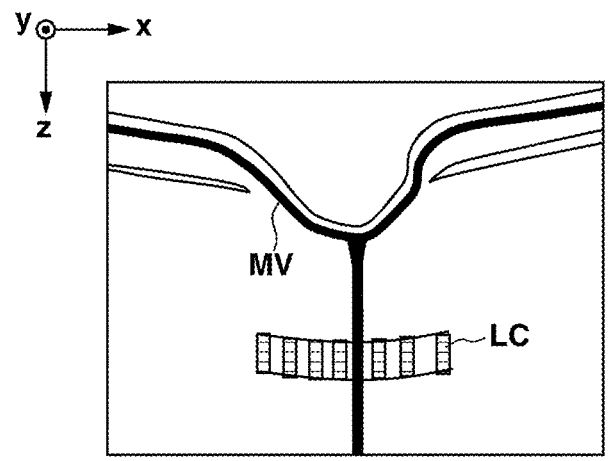
FIG. 20B illustrates example contents of the image processing according to the sixth exemplary embodiment.
Figure 20C:
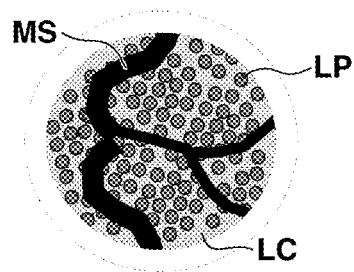
FIG. 20C illustrates example contents of the image processing according to the sixth exemplary embodiment.

The lamina cribrosa LC is a high-luminance disk-shaped tissue that underlies the retina of the optic nerve head, as illustrated in FIGS. 20B and 20C. Numerous small pores, which are referred to as lamina cribrosa pores LP, are present in the lamina cribrosa LC. A nerve fiber stretches in the lamina cribrosa pore LP. If the lamina cribrosa LC undulates, it induces the disorder of the nerve fiber and may lead to glaucoma. Hence, measuring the shape and the distribution of the lamina cribrosa LC and the lamina cribrosa pores LP and detecting the abnormality in the measurement values is expected to be effective in realizing early detection of the glaucoma.

However, the blood vessel MS having the larger blood vessel diameter VW stretches on the nose side of an excavatio disci of the optic nerve head. It is difficult to observe lamina cribrosa pores LP because a shadow caused by red blood cells occurs in a region above the lamina cribrosa LC if the x-y position is identical to that of region MS. The blood vessel diameter VW is larger than the size of white blood cells, it is usual that white blood cells are surrounded by red blood cells when the white blood cells pass in the blood vessel.

Further, even in a blood vessel intersecting region, the incident light can reach the lamina cribrosa LC only when the number of white blood cells is comparable to the number of intersections. Therefore, it is useful to exclude such a region from the measurement target, so that the reliability of measurement values can be secured.

To surely acquire the position and the shape of a region whose luminance value is low because of a shadow caused by blood cells (not by deficient cells (or tissue) in the deep part), the image processing apparatus according to the present exemplary embodiment uses an SLO moving image DI captured in a state where the focus position is set in the vicinity of a retinal blood vessel MV. In this case, the SLO moving image does not include any cells (or tissue) that are present in the deep part because the focus position is close to the surface layer.

The image processing apparatus according to the present exemplary embodiment detects the region MS including the larger blood vessel diameter VW and any intersectional region from the SLO moving image DI and excludes the detected regions from the measurement target. Thus, the reliability of measurement values relating to the shape and the distribution of cells (or tissue) can be secured.

Figure 18:
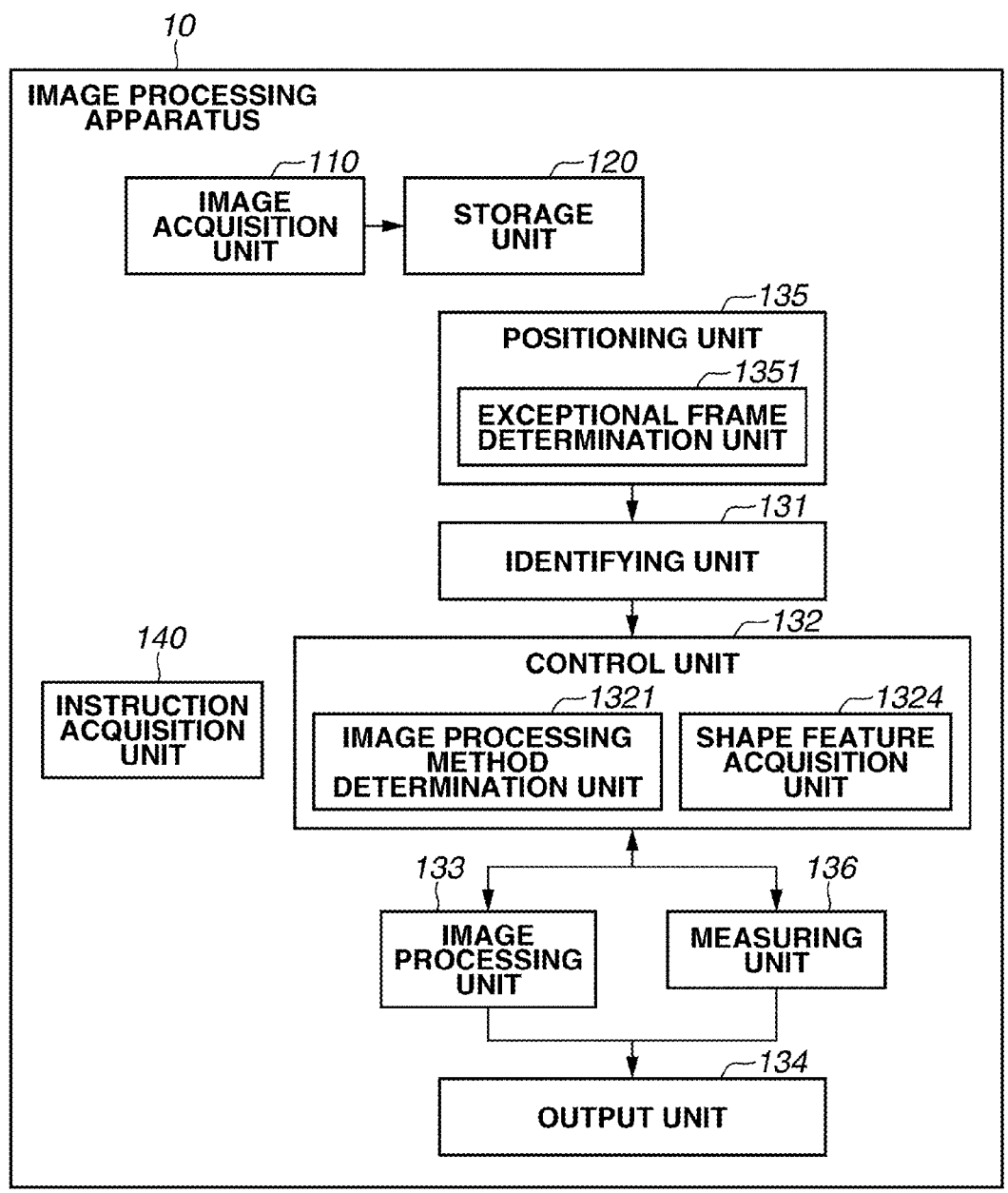
FIG. 18 illustrates an example configuration of an image processing apparatus according to a sixth exemplary embodiment.

FIG. 18 is a functional block diagram illustrating the image processing apparatus 10 according to the present exemplary embodiment. The image processing apparatus 10 illustrated in FIG. 18 is different from the apparatus described in the fifth exemplary embodiment in that the control unit 132 includes the shape feature acquisition unit 1324.

Figure 19:
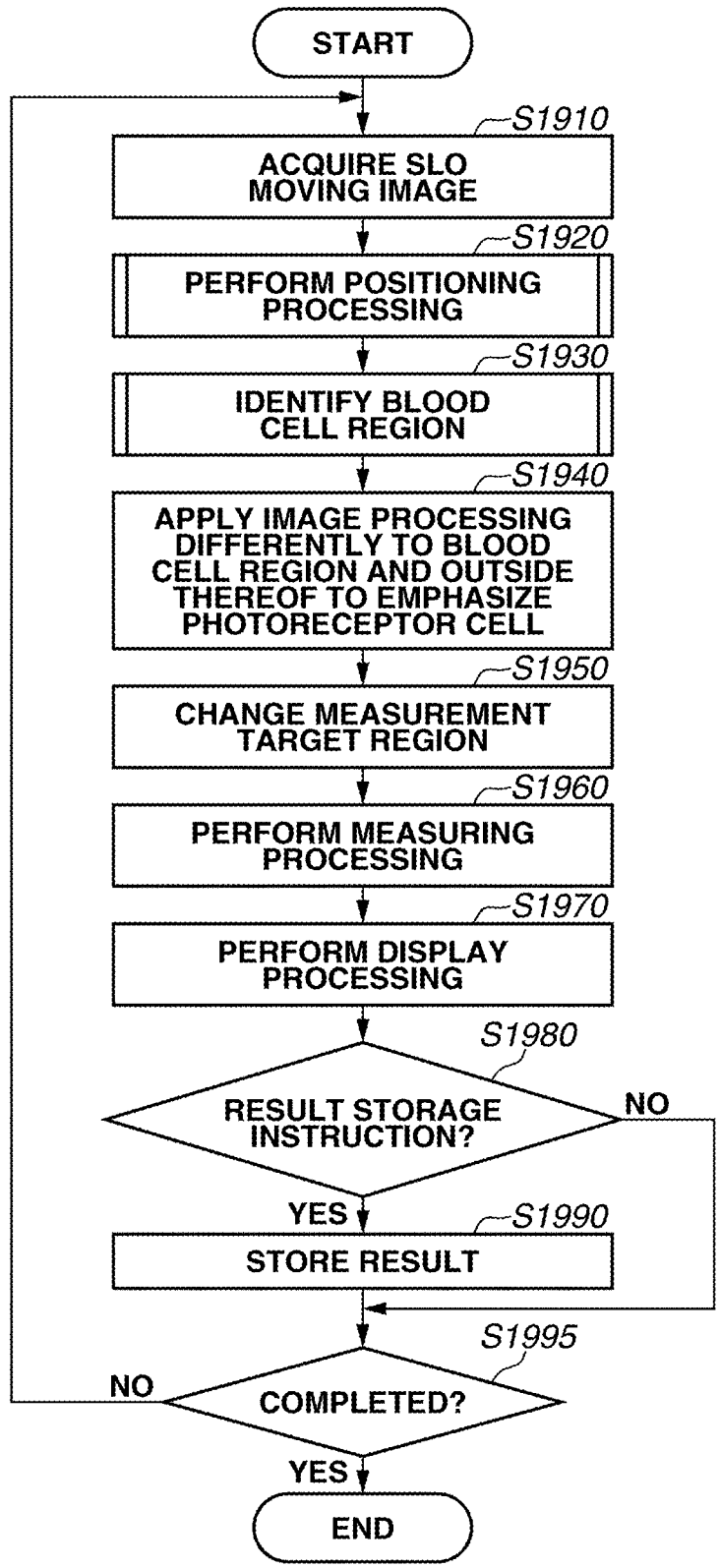
FIG. 19 is a flowchart illustrating an example of image processing that can be performed by the image processing apparatus according to the sixth exemplary embodiment.

FIG. 19 is a flowchart illustrating an example flow of the image processing that can be performed by the image processing apparatus 10 according to the present exemplary embodiment. Processing to be performed in step S1980, step S1990, and step S1995 is similar to the processing described in the fifth exemplary embodiment and therefore the description thereof is not repeated.

<Step S1910>

The image acquisition unit 110 instructs the adaptive optics SLO to acquire an SLO moving image DI captured in a state where the focus position is set on the retinal blood vessel MV and an SLO moving image DO captured in a state where the focus position is set in the vicinity of the lamina cribrosa LC. The image acquisition unit 110 receives the SLO moving image DI and the SLO moving image DO from the adaptive optics SLO, and stores the acquired image data in the storage unit 120.

<Step S1920>

The registration unit 135 performs registration processing for frames of the SLO moving image DI and the SLO moving image DO. The registration method to be applied to respective SLO moving images is similar to the method employed in step S720 described in the second exemplary embodiment and therefore the detailed description thereof is not repeated.

<Step S1930>

The identifying unit 131 identifies the blood cells or the blood cell moving region with reference to an image captured in a state where the focus position in the depth direction is set on the inner retina and an image captured when the focus position is set on the lamina cribrosa underlying the retina. The identifying unit 131 identifies a blood vessel region included in the SLO moving image DI and a blood cell region included in the SLO moving image DO.

To identify the blood cell region, the identifying unit 131 performs the following processing i) through iv).

i) The identifying unit 131 identifies a blood vessel region including a red blood cell region, on the SLO moving image DI.

ii) The shape feature acquisition unit 1324 identifies an intersectional region included in the SLO moving image DI, with reference to the region MS including the larger blood vessel diameter VW, and using a conventionally known intersection detection filter.

iii) The identifying unit 131 performs inter-frame differential processing on the SLO moving image DO to identify a blood cell moving region.

iv) The identifying unit 131 calculates a statistics on luminance value in the frame direction at each x-y position of the inter-frame differential image of the SLO moving image DO to identify a frame that includes white blood cells.

The processing to be performed in this step is described in detail below in steps S2110 to S2190.

<Step S1940>

Figure 20D:
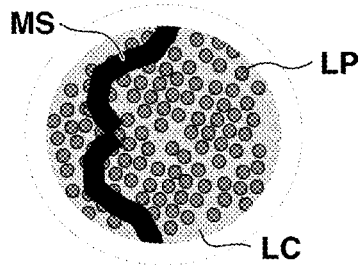
FIG. 20D illustrates example contents of the image processing according to the sixth exemplary embodiment.

The image processing method determination unit 1321 instructs the image processing unit 133 to perform image correction processing using the luminance value of the high-luminance blood cell region identified in step S1930. The image processing unit 133 corrects the shadow region of the SLO moving image DO that has been caused by blood cells. When the above-described correction processing is applied to the shadow region caused by blood cells illustrated in FIG. 20C, correcting the shadow is feasible in a region corresponding to a thin blood vessel as illustrated in FIG. 20D.

<Step S1950>

The control unit 132 restricts a region to be designated as a measurement target, with respect to the region relating to the movement of blood cells, based on at least one of the blood vessel diameter and the blood vessel intersecting state. The control unit 132 instructs the measuring unit 136 to exclude the region MS including the large blood vessel diameter VW and the intersectional region identified by the shape feature acquisition unit 1324 from the measurement target.

<Step S1960>

The measuring unit 136 detects the lamina cribrosa LC and the lamina cribrosa pores LP in the region instructed by the control unit 132 and measures the shape and the distribution of the lamina cribrosa pores LP. Further, if it is determined that a change amount in luminance value before and after the image correction processing applied to the identified region or a change amount in measurement value before and after the measurement parameter change processing is greater than a threshold value, the measuring unit 136 identifies the region as a lesion candidate region. Further, the measuring unit 136 removes an identified region intersecting position and a region where the blood vessel diameter is greater than a threshold value from the lesion candidate region.

First, the measuring unit 136 binarizes the corrected SLO image with a threshold value $T1c$ to detect the lamina cribrosa LC region. Further, the measuring unit 136 performs shaping processing on the lamina cribrosa LC region that has been detected with an applied morphology filter. The shape abnormality of the lamina cribrosa LC can be observed on the SLO image as a change in measurement values of i) the area of the lamina cribrosa pore LP, ii) the ratio of a major axis to a minor axis in a case where the lamina cribrosa pore LP is expressed as an ellipse, iii) the central position of the lamina cribrosa pore LP, and iv) the closest distance between the lamina cribrosa pores LP. Hence, the measuring unit 136 calculates i) through iv) as measurement items relating to the shape and the distribution of the lamina cribrosa pores LP.

<Step S1970>

The output unit 134 displays the image corrected SLO image, together with measurement results relating to the shape and the distribution of the lamina cribrosa pores LP measured by the measuring unit 136, on the monitor 305. In the present exemplary embodiment, the region MS having the large blood vessel diameter and the intersectional region identified from the SLO moving image DI are given a unique color indicating that these regions are excluded from the measurement target region.

Figure 21:
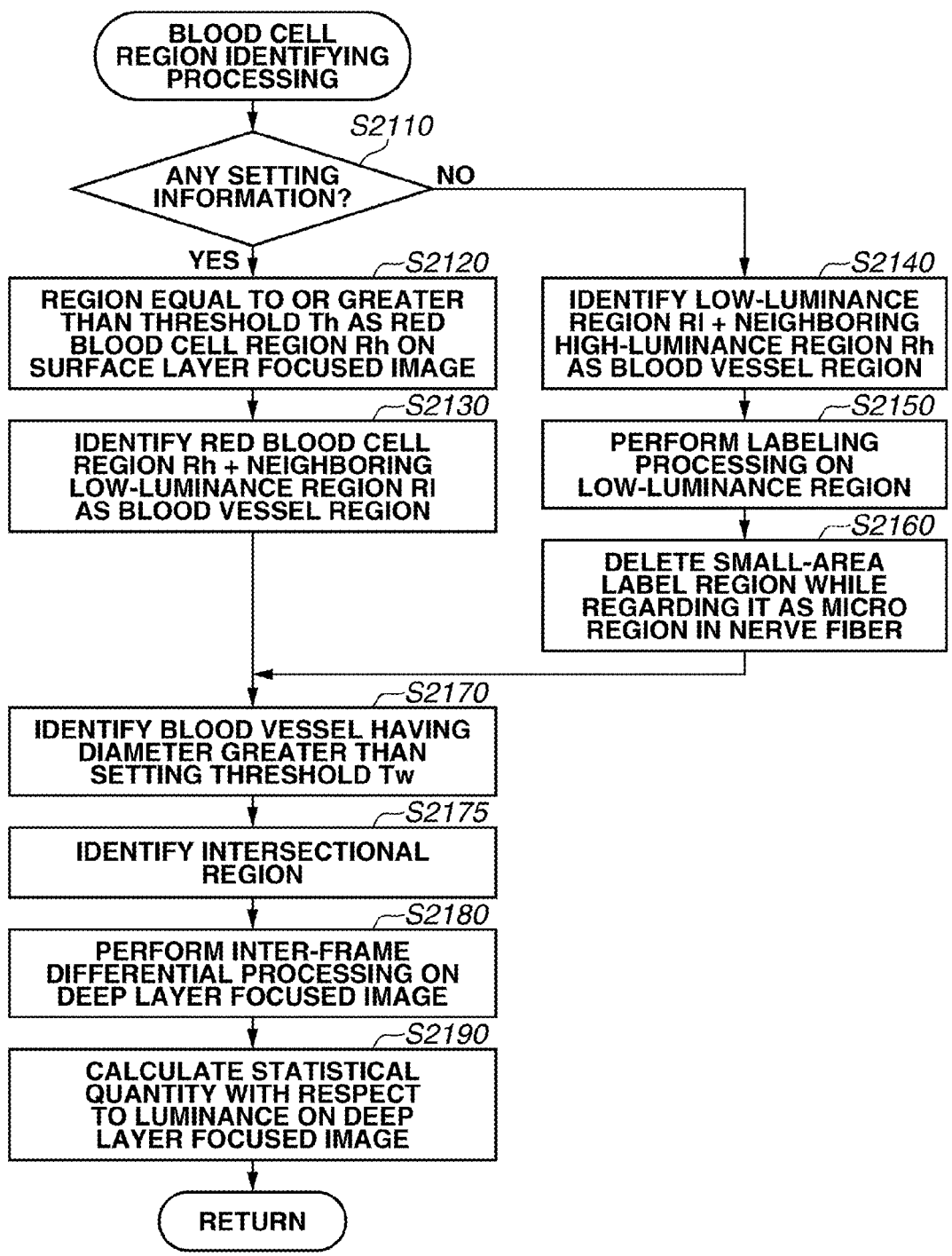
FIG. 21 is a flowchart illustrating details of blood cell region identifying processing.

The non-measurement target region highlighting method is not limited to the above-described example and any arbitrary display method is usable. Next, the processing to be performed in step S1930 is described in detail below with reference to flowcharts illustrated in FIG. 20 and FIG. 21.

<Step S2110>

In step S2110, the identifying unit 131 acquires setting information that designates one of a plurality of types of blood vessel region identifying processing. If the setting information designates the first blood vessel region identifying processing (YES in step S2110), the operation proceeds to step S2120. If the setting information is not present (NO in step S2110), the operation proceeds to step S2140.

In step S2120, the identifying unit 131 identifies the blood vessel region included in the SLO moving image DI captured in the state where the focus position is set in the vicinity of the retinal blood vessel MV. More specifically, the identifying unit 131 sets a region that is equal to or greater than a threshold value Th as a red blood cell passing region Rh as illustrated in FIG. 20A. In step S2130, the identifying unit 131 identifies a sum of the region Rh and a neighboring low-luminance blood vessel wall R1 that is less than a threshold value T1, as the blood vessel region.

In step S2140, the identifying unit 131 obtains the low-luminance region R1 that is equal to or less than the threshold value T1. The identifying unit 131 identifies a sum of the region R1 and a neighboring high-luminance region Rh as the blood vessel region. In step S2150, the identifying unit 131 performs labeling processing on the low-luminance region. In step S2160, the identifying unit 131 deletes a small area label region while regarding it as a micro region in the nerve fiber (i.e., a region other than the blood vessel region).

<Step S2170>

The identifying unit 131 calculates the blood vessel diameter VW at each position of the blood vessel region identified in the above-described processing. For example, the region Rh can be regarded as extending along the central axis of the blood vessel. Therefore, the identifying unit 131 measures the blood vessel diameter VW in a direction perpendicular to the region Rh and identifies a region in which the blood vessel diameter is equal to or greater than a threshold value Tw as the region MS including the larger blood vessel diameter VW.

<Step S2175>

The identifying unit 131 detects the intersectional region using the intersection detection filter. In the present exemplary embodiment, the commonly-known intersection detection filter is usable. More specifically, in a case where the number of blood vessel regions in the outer peripheral region of the filter is equal to or greater than 4 and at least one blood vessel region is present in the central region of the filter, the identifying unit 131 identifies the region as the intersectional region.

<Step S2180>

The identifying unit 131 performs inter-frame differential processing on the SLO moving image DO captured in the state where the focus position is set in the vicinity of the lamina cribrosa LC.

<Step S2190>

The identifying unit 131 calculates a statistics on luminance value (i.e., a variance) in the frame direction at each x-y position of the inter-frame differential image of the SLO moving image DO obtained in step S2180 and identifies a region in which the variance value is equal to or greater than a threshold value as a blood cell moving range.

Next, the identifying unit 131 calculates a maximum luminance value in the frame direction at each x-y position of the blood cell moving region, and regards a frame number that corresponds to the maximum value as indicating a region in which white blood cells are present. In the present exemplary embodiment, the image processing apparatus measures the shape and the distribution of lamina cribrosa pores LP in the lamina cribrosa LC of the optic nerve head. However, the claimed invention is not limited to the above-described example.

For example, in a shadow region that may be caused by blood cells at a macula of a retina, it is useful to exclude the region where measurement errors may occur (e.g., a region where the blood vessel diameter is large or an intersectional region) from the measurement target region before measuring the shape and the distribution of photoreceptor cells C.

When the above-described configuration is employed, the image processing apparatus 10 excludes the region MP including the larger blood vessel diameter VW and the intersectional region from the measurement target region before it measures the shape and the distribution of lamina cribrosa pores LC.

Thus, the image processing apparatus according to the present exemplary embodiment can accurately measure the shape and the distribution of cells (or tissue) because the measurement is performed after any region where measurement errors may occur is excluded from the measurement target.

Other Exemplary Embodiment

In the above-described sixth exemplary embodiment, a part of the region relating to the movement of blood cells is excluded from the measurement target region. The claimed invention is not limited to the above-described examples. In another exemplary embodiment, although the measuring unit 136 performs measurement for all regions, the output of measurement results by the output unit 134 is restricted in such a way as to disregard the above-described region from the output target. This arrangement is useful to simplify the processing to be performed by the measuring unit 136.

Further, in the first to fifth exemplary embodiments, the control unit 132 can restrict the region to be subjected to the image correction processing performed by the image processing unit 133, of the region relating to the movement of blood cells, based on at least one of the blood vessel diameter and the blood vessel intersecting state. This arrangement is useful to increase the speed of the correction processing. Further, the control unit 132 restricts an output target region of the output unit 134 with respect to the tissue information. It is feasible to provide highly reliable information to a user.

In the above-described sixth exemplary embodiment, if the blood vessel diameter is equal to or greater than a threshold value, the region is excluded from the measurement target, the output target, or the image processing correction target. If the threshold value is changeable according to a signal from the operation unit 50 that receives an input from a user, it is feasible to obtain an image or an output result desired by each user. The control unit 132 receives the input signal from the operation unit 50 and transmits a feedback result to the image processing unit 133 and the measuring unit 136. In this respect, the control unit 132 is functionally operable as an identifying unit configured to identify a non-processing target region in a frame image.

The above-described user setting of the threshold value is not limited to the sixth exemplary embodiment and can be similarly applied to each of the first to fifth exemplary embodiments. As another exemplary embodiment, it is useful to enable a user to set the threshold value to 0 by operating the operation unit 50. More specifically, the following method i) or ii) is employable to designate the non-measurement target region.

i) The measuring unit 136 excludes a blood cell moving region, if the diameter of the blood cell moving region is equal to or greater than a value designated by the user, from the measurement target. In this case, all blood cell moving regions can be excluded from the measurement target by designating the parameter to 0.

ii) The image processing unit 133 excludes a region, if the luminance value of a blood cell moving region having been subjected to the image correction processing is equal to or less than a value designated by a user, from the measurement target. In this case, all blood cell moving regions can be excluded from the measurement target by designating the parameter to the highest luminance value (e.g., 255 if 8-bit data or 65535 if 16-bit data).

In this case, the image processing unit 133 of the image processing apparatus 10 can perform image processing according to a user request without including any blood cell moving region and the measuring unit 136 can calculate measurement values. In this case, on the outside of the blood cell moving region, it is feasible to obtain a processed image or information relating to the measurement results.

Further, as another exemplary embodiment, according to an operational instruction input by a user via the operation unit 50, the image processing unit 133 can perform image processing correction for only the blood cell moving region and the measuring unit 136 can calculate measurement values. To attain this processing, it is useful that the identifying unit 131 performs labeling processing for the blood cell moving region and other region.

Further, the output unit 134 can output measurement values independently for the blood cell moving region and other region, so that a user can compare the output measurement values. Further, the output unit 134 can calculate a difference between measurement values and inform a deviation of the calculated differential value relative to a predetermined threshold value.

In the sixth exemplary embodiment, two images selected to identify the blood vessel region are the SLO moving image focused on the inner layer and the SLO moving image focused on the lamina cribrosa. As a modified arrangement applicable to the first to fifth exemplary embodiments, an SLO moving image focused on an inner layer and an SLO moving image focused on an outer layer are usable to improve the accuracy in identifying the blood vessel region.

Appropriately combining the above-described first to sixth exemplary embodiments is feasible.

In the above-described exemplary embodiment, the scanning laser ophthalmoscope captures a fundus image. However, the claimed invention is not limited to the above-described example. For example, it is useful to use a fundus image captured by a fundus camera that includes an adaptive optics system. The reason why the ophthalmologic imaging apparatus equipped with the adaptive optics system is used in the above-described exemplary embodiments is because it is necessary to capture an image of a fundus retina region relating to the movement of blood cells, photoreceptor cells, and lamina cribrosa. Therefore, in this respect, the claimed invention encompasses an exemplary embodiment employing an imaging apparatus other than the imaging apparatus equipped with the adaptive optics system.

The imaging target to be processed by the image processing apparatus described in the above-described exemplary embodiments is photoreceptor cells of a macula or a lamina cribrosa of an optic disc. However, the claimed invention is not limited to the above-described example. For example, the image processing apparatus can capture an image of photoreceptor cells in the vicinity of an optic disc and obtain an image corrected through the above-described processing.

As another exemplary embodiment of the claimed invention, it is useful to provide an image processing system including a plurality of apparatuses that can cooperatively realize the above-described functions of the image processing apparatus. For example, a CPU of a computer can execute software programs to realize the above-described functions of the image processing apparatus. Further, the claimed invention encompasses a storage medium that stores software programs that can realize the exemplary embodiments of the claimed invention. As described above, when the image processing to be applied is changeable for each region, a user can easily recognize tissue information in a blood vessel region.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-034345 filed Feb. 20, 2012, which is hereby incorporated by reference herein in its entirety.

The invention claimed is:

1. An image processing apparatus comprising:
   an identifying unit configured to identify a region relating to the movement of blood cells on a fundus image captured by an ophthalmologic imaging apparatus that includes an adaptive optics system; and
   an acquisition unit configured to acquire information relating to a tissue that is positioned on a back side of a position where the movement of blood cells is recognized, when it is seen from an anterior eye part side, in the identified region.

2. The image processing apparatus according to claim 1, wherein the acquisition unit is configured to acquire information relating to the fundus tissue by applying processing differently to the identified region and to a region that is different from the identified region.

3. The image processing apparatus according to claim 1, wherein the identifying unit is configured to identify the region relating to the movement of blood cells based on any one of a difference and a ratio in pixel value between a first frame and a second frame of the fundus image, which is a moving image.

4. The image processing apparatus according to claim 3, wherein the identifying unit is configured to identify a region as the blood cell moving region if in the region a temporal degree of dispersion in pixel value of the moving image is greater than a specific threshold value.

5. The image processing apparatus according to claim 3, wherein the identifying unit is configured to identify a frame image, if a pixel value at a specific position of the blood cell moving region is greater than a specific value, as a frame indicating the position of blood cells at the specific position.

6. The image processing apparatus according to claim 1, wherein the identifying unit is configured to identify a region relating to the position of white blood cells.

7. The image processing apparatus according to claim 1, wherein the identifying unit is configured to identify the region relating to the movement of blood cells when the fundus image is an image of photoreceptor cells that can be captured by the ophthalmologic imaging apparatus or an image of a lamina cribrosa of an optic nerve head that can be captured by the ophthalmologic imaging apparatus.

8. The image processing apparatus according to claim 1, wherein the acquisition unit includes an image processing unit configured to correct the fundus image through the processing and obtain the corrected image as tissue information.

9. The image processing apparatus according to claim 8, wherein the image processing unit is configured to apply reduction processing, which is capable of reducing blood cell shadow information, in the region relating to the movement of blood cells.

10. The image processing apparatus according to claim 8, wherein the image processing unit is configured to apply noise reduction processing to a region that is different from the region relating to the movement of blood cells.

11. The image processing apparatus according to claim 8, wherein the image processing unit is configured to form an image by selecting a pixel value greater than a specific pixel value from each frame image, based on a time-directional distribution of pixel values in the region relating to the movement of blood cells.

12. The image processing apparatus according to claim 11, wherein the image processing unit is configured to form an image based on a time-directional average of the pixel values that are greater than the specific pixel value at each position of the region relating to the movement of blood cells.

13. The image processing apparatus according to claim 1, further comprising:
a deficiency determination unit configured to determine a deficient area of the tissue based on fundus images obtained through the image processing independently applied to the identified region and to the fundus image region different from the identified region.

14. The image processing apparatus according to claim 13, wherein the deficiency determination unit is configured to identify a blood vessel region and determine a deficient area of photoreceptor cells based on a difference between a time-directional peak in pixel value and a time-directional average level in pixel value, in the blood vessel region.

15. The image processing apparatus according to claim 1, wherein
the acquisition unit includes a measurement unit configured to acquire tissue related information from the fundus image and obtain the acquired information as the tissue information.

16. The image processing apparatus according to claim 15, wherein the measurement unit is configured to obtain information relating to distribution, abnormality, or deficiency of photoreceptor cells or a lamina cribrosa underlying a blood vessel, as the tissue information.

17. The image processing apparatus according to claim 1, further comprising:
a control unit configured to perform a control to differentiate the processing applied to the identified region and to the fundus image region different from the identified region.

18. The image processing apparatus according to claim 17, wherein the acquisition unit includes a measurement unit configured to acquire tissue related information from the fundus image and obtain the acquired information as the tissue information,
wherein the control unit is configured to differentiate a threshold value, which is referred to when the measurement unit detects a tissue in the fundus image, for the region relating to the movement of blood cells and other region.

19. The image processing apparatus according to claim 17, further comprising:
an output unit configured to output fundus tissue information obtained when the processing is applied,
wherein the control unit is configured to restrict an image processing apply region relating to the movement of blood cells, or an output target region by the output unit relating to the tissue information, based on at least one of blood vessel diameter and blood vessel intersecting state.

20. The image processing apparatus according to claim 1, further comprising:
a frame determination unit configured to identify a frame image as a processing target based on image information, in the fundus image, which is a moving image,
wherein the identifying unit is configured to identify a region of the fundus image, if a temporal degree of dispersion in pixel value is greater than a specific threshold value, as the region relating to the movement of blood cells, and wherein the identifying unit excludes a frame image, if it is determined as a non-processing target, before measuring the variance.

21. An ophthalmologic imaging system comprising:
the image processing apparatus according to claim 1;
an ophthalmologic imaging apparatus configured to capture a fundus image while compensating an aberration of an eye part with an adaptive optics system; and
a display unit configured to display tissue related information obtained by the acquisition unit of the image processing apparatus.

22. An image processing apparatus comprising:
an identifying unit configured to identify a region in which a temporal degree of dispersion in pixel value is greater than a specific threshold value, in a fundus moving image obtained by an ophthalmologic imaging apparatus that includes an adaptive optics system;
an image processing unit configured to obtain tissue information based on pixel values that are greater than a specific threshold value, which can be acquired from frame images of the moving image, at each position of the region; and
a display control unit configured to display the tissue information obtained by the image processing unit on a display unit.

23. An image processing apparatus comprising:
an identifying unit configured to identify a region relating to the movement of blood cells on a fundus image obtained by an ophthalmologic imaging apparatus that includes an adaptive optics system;
an additional identifying unit configured to identify a non-processing target region in the identified region;
an image processing unit configured to acquire tissue information from a fundus image region that excludes the non-processing target region; and
a display control unit configured to display the tissue information obtained by the image processing unit on a display unit.

24. A non-transitory computer readable medium for storing a program causing a computer to execute image processing, the image processing comprising:
identifying a region relating to the movement of blood cells on a fundus image captured by an ophthalmologic imaging apparatus that includes an adaptive optics system; and
acquiring information relating to a tissue that is positioned on a back side of a position where the movement of blood cells is recognized, when it is seen from an anterior eye part side, in the identified region.

* * * * *